United States Patent [19] [11] 4,236,210

Terakawa et al. [45] Nov. 25, 1980

[54] ARCHITECTURE FOR A CONTROL STORE INCLUDED IN A DATA PROCESSING SYSTEM

[75] Inventors: Kiyoshi H. Terakawa, Framingham; William E. Woods, Natick, both of Mass.

[73] Assignee: Honeywell Information Systems Inc., Waltham, Mass.

[21] Appl. No.: 947,987

[22] Filed: Oct. 2, 1978

[51] Int. Cl.³ .............................................. G06F 9/00
[52] U.S. Cl. .................................................... 364/200
[58] Field of Search ... 364/200 MS File, 900 MS File

[56] References Cited

U.S. PATENT DOCUMENTS

| 3,828,320 | 8/1974 | Dinerman et al. | 364/200 |
| 4,045,782 | 8/1977 | Anderson et al. | 364/200 |
| 4,131,941 | 12/1978 | Siegel et al. | 364/200 |

Primary Examiner—Raulfe B. Zache

Attorney, Agent, or Firm—John S. Solakian; Nicholas Prasinos; Ronald T. Reiling

[57] ABSTRACT

A control store coupled with a central processing unit to transfer information over a common electrical bus and coupled to transfer information over a private interface between the control store and unit. The control store includes firmware words for providing additional control of the unit, which also has a control memory for controlling the operation of the unit. The private interface is used to transfer addressed firmware words from the control store to the unit for use by the unit including generating the next address to be used by the control store, which next address is also provided from the unit to the control store over the private interface. Such private interface is also used to transfer the results of one or more tests performed by the unit, which results indicate which of at least two alternative addresses are to be used by the control store.

24 Claims, 28 Drawing Figures

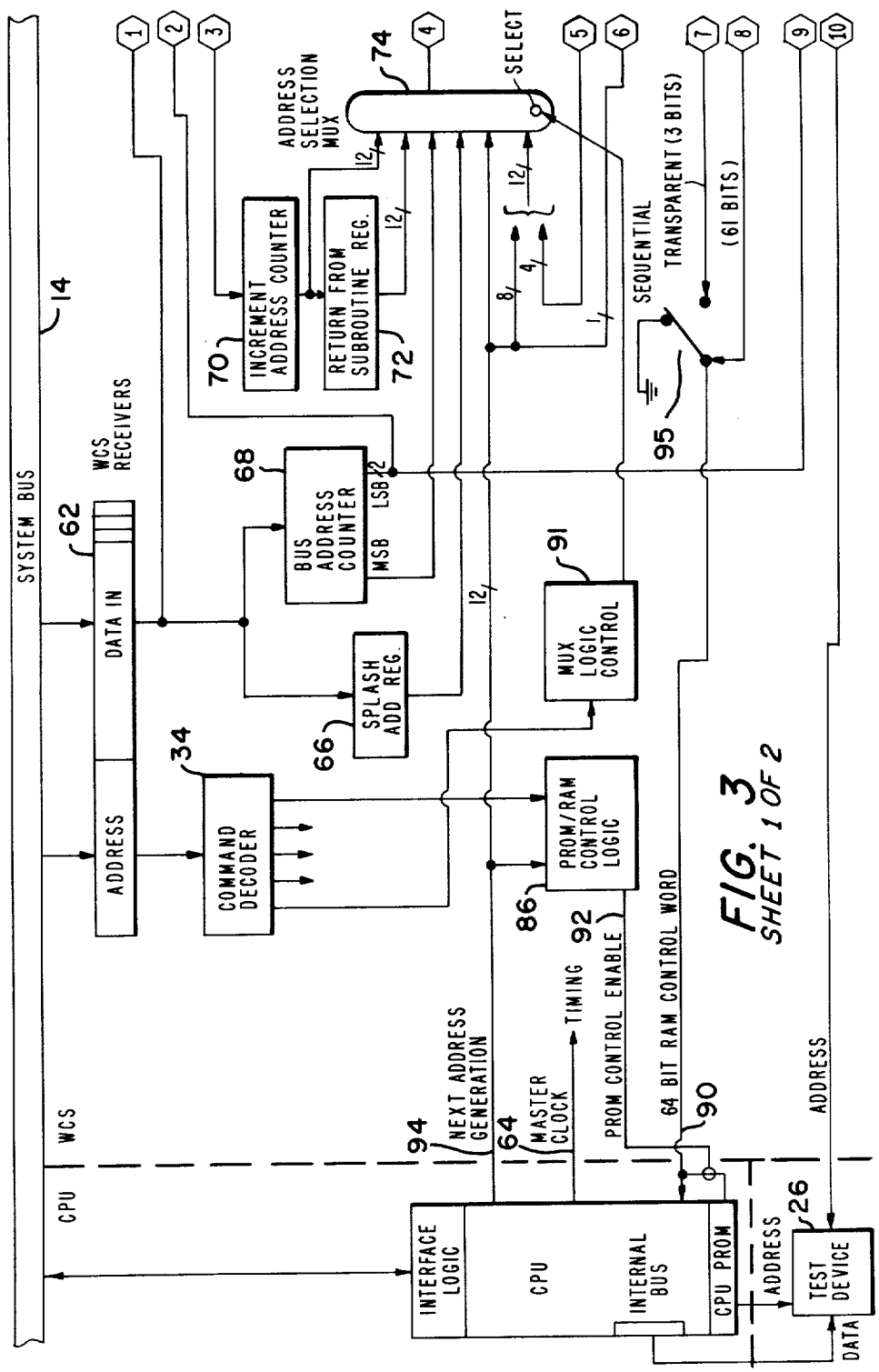
FIG. 3 SHEET 1 OF 2

ARCHITECTURE FOR A CONTROL STORE INCLUDED IN A DATA PROCESSING SYSTEM

SUMMARY OF THE INVENTION

The objects of the present invention are achieved by providing a data processing system having a central processing unit with its own control memory for storing control words used in controlling the operation of the unit and a control store having its own control memory for storing additional control words used to control the operation of the unit. An electrical bus is provided to couple the unit and the control store, by which the unit addresses the control store and transfers instructions to the control store, and over which the control store transfers control words to the unit. A private interface is also provided between the unit and the control store, over which the unit transfers addresses to the control store for use by the control store and over which the control store transfers an addressed control word to the unit. The control store includes a plurality of sources for addressing its control memory by use of a multiplexed organization thereof.

BACKGROUND OF THE INVENTION

The present invention generally relates to data processing systems and more particularly relates to a system with a central processing unit which has user-accessible control storage.

Today's continued advancement of computer technology has produced a user-accessible control store extension within a central processor unit (CPU), which extension is sometimes called a writeable control store (WCS). This WCS feature provides a user with extremely powerful hardware instructions that extend as well as enhance the standard CPU software instruction set to achieve optimum CPU performance for software routines critical to a particular user application, and allows them to execute at speeds comparable to the native CPU instructions. They accomplish this by enabling a user to write customized firmware into a CPU to replace repetitive software routines. Much of the speed enhancement derives from the ability of the firmware to perform several simultaneous operations in a single firmware step. The application for the WCS feature varies considerably from one user to another. It enables a microprogrammer to enhance and augment the native CPU firmware to produce the equivalent of a custom built, specialized central processor. Software routines (or programs) designed to run without the WCS feature are unaffected by its presence. With effective firmware instructions, a user can increase the overall performance of the CPU with a minimum conversion of software programs.

Microprogramming and more particularly writeable control store are described in a book entitled "Microprogramming: Principles and Practice", by Samir S. Husson, 1970, Prentice-Hall, Inc. Further, U.S. Pat. No. 4,042,972, issued Aug. 16, 1977, describes a computer system in which a writeable control store is used in addition to the control store located internally in the central processor.

It is accordingly a primary object of the present invention to provide an improved writeable control store for use in a data processing system, which writeable control store is usable in extending the capabilities of the system based on each particular user's requirements.

BRIEF DESCRIPTION OF THE DRAWINGS

For a full understanding of the nature and object of the invention, reference should be had to the following detailed description, taken in connection with the accompanying drawings, in which.

DETAILED DESCRIPTION OF THE PREFERRED EMBODIMENT(S)

Figure 1:
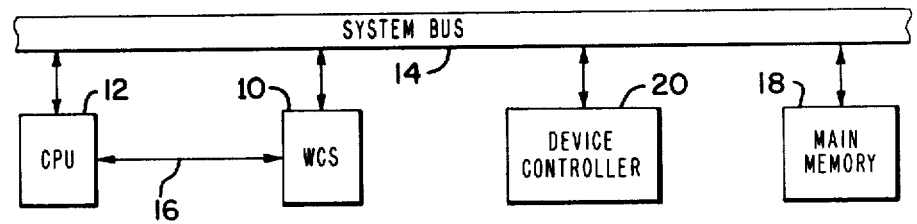
FIG. 1 is a block diagram illustrating the environment of the present invention.

The Writeable Control Store (WCS) 10 of FIG. 1 enhances associated central processor (CPU) 12 by providing additional storage for firmware that can be altered by program instructions to meet the specific requirements of the user. This feature permits the central processor to execute user-defined instructions that direct hardware operations according to the firmware that is created by the user and loaded into the alterable storage. The WCS does not replace firmware for the standard CPU instruction set but provides a means for the user to add to it. Firmware coded by the user to implement user-defined instructions is loaded into WCS storage via the system bus 14 using I/O instructions. A private interface 16 between the CPU and WCS provides a direct path to the CPU for execution of custom firmware when a user-defined instruction is encountered. FIG. 1 shows a typical system incorporating a WCS, and illustrates for example other elements such as a main memory 18 and a device controller 20.

Figure 2:
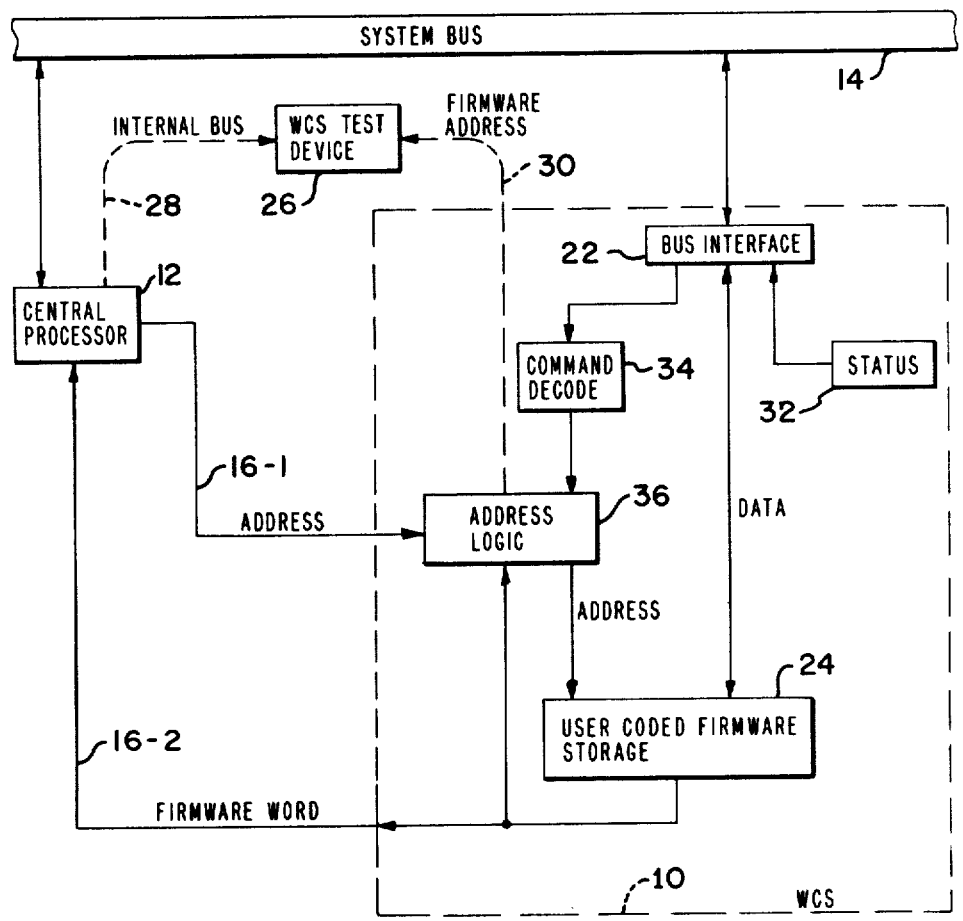
FIG. 2 is a general block diagram of the storage device of the present invention.

As shown in FIG. 2, the Writeable Control Store 10 includes bus interface 22, user coded firmware storage 24, status logic 32, command decode logic 34 and address logic 36. The WCS may also include an optional test device 26 that can be temporarily installed in the system as shown in FIG. 2. The WCS 10 interprets function code commands and processes dialogue over the bus 14 between the CPU and WCS for loading user firmware into storage and for the initiation of firmware that executes the user-defined instructions. The test device 26 can be temporarily installed in the system to assist the user in debugging his coded firmware. It displays the CPU internal bus 28 and firmware address 30 for the current or any of sixteen previous firmware cycles. The test device can also be used to single-cycle firmware execution and for STOP ON ADDRESS operations.

There are two distinct operations that concern the WCS: (1) loading the user coded firmware; (2) execution of user coded firmware routines. The user's firmware is loaded into the WCS storage by issuing I/O instructions that result in standard CPU firmware controlling the transfer of data from the CPU to the WCS via the bus 14. Separate I/O instructions are issued for the transfer of each word (e.g., 16 bits per word) to or from the CPU. The user coded firmware must be loaded into WCS storage 24 before it can be executed. User's firmware is executed by reading firmware words from the WCS storage 24 and transferring them to the CPU where they are processed. The contents of each firmware word determines the address of the succeeding firmware word to be executed. To enter this process, a user-defined instruction must be encountered during computer program execution. This results in the CPU standard firmware transferring the instruction code over the data lines of bus 14 to the WCS 10 where it is used to select an entry point in the user firmware. This enables the user firmware to gain control of the CPU hardware and the user firmware processing commences.

When the user-coded firmware routine has completed execution and control is to revert back to the standard CPU firmware, the user generates an I/O output command to the WCS at the end of his coded firmware routine. This command switches control from the user firmware to the standard CPU firmware. The standard CPU firmware automatically generates the command that enters user firmware processing, but the user must generate the I/O instruction in his firmware to return to standard CPU firmware control.

The user firmware can be sequenced through execution in one of two modes: (1) WCS sequential mode, or (2) transparent mode. In both of these modes the next firmware address is determined by the user's firmware coding. However, in sequential mode, firmware branch coding is restricted and the WCS logic, via command decode logic 34, interprets the branch code field of the firmware word to determine which of four sources contains the next address. In transparent mode all branch codes are valid and normal CPU next address generator (NAG) logic interprets the full firmware word and generates the next firmware address which is transferred to the WCS.

Figure 3:
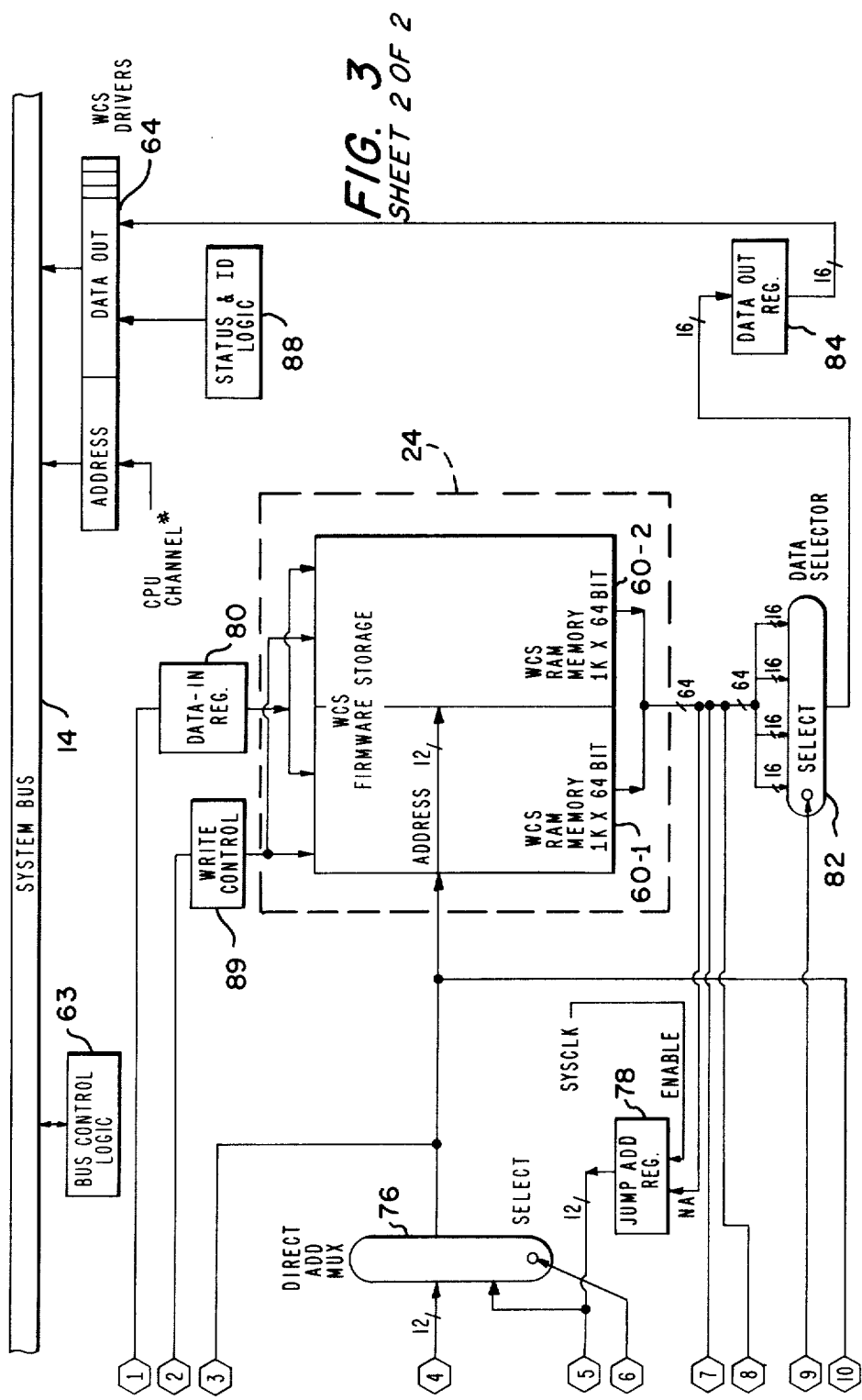
FIG. 3 is a detailed block diagram of the storage device of the present invention.

The two firmware sequencing modes of the WCS, transparent and sequential, are mutually exclusive. The WCS must be set, by a manually operated or other type switch 95 (as shown in FIG. 3), into one mode or the other. The difference between the two modes appears in the assignment of control store addresses to successive steps of a firmware routine. In this respect, for sequential mode, the microprogrammer assigns an initial address (origin), after which there is an automatic incrementing of the address for each new step. Conditional branches represent a choice between continuing in sequence and taking some other action (branch to a specified location, or "call" a subroutine, or "return"). In contrast, the microprogrammer working with transparent code will rarely allow system assignment of the address of the next step, even when the values are adjacent. Every step in transparent mode explicitly specifies the address of its successor, which may equally reside anywhere in the 2048-location firmware bank. Conditional branches represent a choice between the address thus specified and an alternate address. In either mode, when no branching is required, the necessary code is generated to progress from step to step. Nevertheless, it should be noted that, in transparent object code, the bits responsible for specifying the next address are occupied at almost every step, whereas in sequential object code, these bits are unused except where branching is called for. This distinction is important because some of these same bits are involved in the generation of constants by the firmware. Therefore, when a particular constant needs to be generated, a restriction is imposed on the value of the next address field. In transparent mode, this restriction requires some extra bookkeeping to keep track of address assignments. In sequential mode, the restriction vanishes when no simultaneous branching is involved; otherwise, it usually requires insertion of an extra firmware step. The choice between the two modes is usually based on the expected frequencies of branching and of constant usage, and the consequent likelihood of their interfering with each other.

A more detailed illustration of the WCS is shown in FIG. 3. It illustrates the WCS hardware components and data flow between the WCS 10, the CPU 12 and the optional test device 26. All commands issued by the CPU to the WCS are transmitted over the system bus 14. The private interface between the CPU and WCS provides a means for the WCS to directly transmit the user firmware word to the CPU. The test device interface allows manual access to firmware storage. The major components of the hardware located in the WCS shall now be described.

The WCS contains system bus control logic 63 which may include receivers 62 and drivers 64 and further logic which is decribed in U.S. Pat. No. 3,993,981, issued November 23, 1976. It provides a means for the CPU and WCS to communicate with each other. The WCS receives command codes along with its channel number from the CPU over the bus 14 address lines. With each command issued, a sixteen bit data word can be received by the WCS on the data lines. The WCS generates the CPU's channel number on its bus address line drivers. Therefore it will transmit data only to the CPU. This data can either be the WCS ID code, WCS status word, or a selected data word (16 bits) from user firmware stored in the WCS RAM 60 included in firmware storage 24. The WCS does not communicate directly with main memory 18.

The WCS command decoder 34 decodes the command code issued to the WCS over the bus 14 address lines. It stores the command type and generates the necessary control signals to perform the action commanded by the CPU. Such commands are described hereinafter.

Basic timing for the WCS is developed directly from the CPU master clock (MCLOCK) and received on line 64. This insures that all WCS and CPU operations are synchronized.

The splash address register 66 is a 5 bit register that provides temporary storage for a task word supplied on some of the bus 14 data lines when an Entry command is issued to the WCS. The contents of this register are used to form the WCS RAM address which causes a branch to the first location of a specific user firmware routine.

The bus address counter 68 is a 14 bit incrementing counter. Its contents are used to address WCS firmware storage 24 when either loading (writing) or reading user firmware via the bus 14. It is initially loaded by a unique WCS command and then incremented as each read or write RAM command is executed. The low order two bits of this register are data word pointer bits. They select the data word (16 bits) within the 64 bit firmware word which is manipulated. This is necessary since the bus 14 can only handle one 16 bit data word per command. Such two low order bits are received for use by the write control logic 89 and data selector 82.

The increment address counter 70 is a 12 bit counter which supplies an incremented firmware address for each CPU clock cycle.

The return from subroutine register 72 is 12 bits wide and stores the return address for the WCS when a firmware branch to a subroutine is executed. When a subroutine return branch is executed, the incremented address loaded in this register is used to return to the main stream of the user firmware.

The WCS user firmware storage 24 includes, by way of example, two RAM memories 60. Each memory, by way of example, contains 1024 locations, each 64 bits wide. Each location store 1 firmware word for a total of 2K (2048) locations of firmware storage. These RAM memories are loaded or read one data word (16 bits) per write/read command respectively. However, when executing, the full 64 bit firmware word is delivered.

The address selection multiplexer (MUX) 74 is a multiple port, 12 bit wide multiplexer. It selects the WCS RAM address which accesses a stored firmware word. The address can be selected from one of several different sources depending on the command stored in the command decoder 34 and the encoding of the current firmware word. The selected address can be overridden as it is delivered to the RAM memory via the direct address multiplexer 76.

The direct address multiplexer (MUX) (DADD) 76 is a two port, 12 bit wide multiplexer. It selects the final address delivered by the WCS to the RAM memories 60. If the CPU detects a condition that requires a firmware branch to the next address coded in the current firmware word, it informs the address MUX 76 to select the next address (NA) field stored in the jump address register 78. Otherwise the multiplexer 76 selects the output of the address selection MUX 74 to address WCS firmware storage 24.

The jump address register 78 stores the NA field of the current firmware word. Its contents are used if a branch to the NA is required.

The data-in register 80 is 16 bits wide and stores the write data word (16 bits) delivered to the WCS when loading firmware into firmware storage 24. It requires four write commands to load one firmware word in RAM memory 60. The 16 bit position of the firmware word written is determined by the write control logic 89 which decodes the pointer bits of the bus address counter 68.

The data selector 82 is a four port, 16 bit wide multiplexer. It receives the 64 bit firmware word read from firmware storage 24 and selects one 16 bit data word within the firmware according to the pointer bits stored in the bus address counter 68. The selected data word can be returned to the CPU via the bus 14.

The data out register 84 stores the selected 16 bit data word that is delivered to the CPU via the bus 14. This data path is used when the system wishes to verify the contents of firmware storage 24.

The PROM/RAM control logic 86 determines whether the firmware in the CPU PROM or the user firmware stored in the WCS is active and controls the CPU. It monitors commands stored in the WCS and CPU conditions to determine which firmware is activated.

The status and ID logic 88 delivers, on command, the WCS status bits or the WCS identifying code to the bus data drivers 64.

There are five major interfaces concerned with the WCS as follows: (1) CPU/WCS Control Store Interface, (2) System Bus Interface, (3) WCS/RAM Memory Interface, (4) WCS/Test Device Interface, and (5) Test Device/CPU Interface. Interfaces (1) and (3) shall now be discussed in detail. Details relating to the bus interface (2) may be seen from the aforementioned patent, and is discussed hereinafter. Interfaces (4) and (5) are not applicable to the present invention.

The CPU/WCS Control Store interface is a private data/control interface between the WCS and the CPU. It provides a direct path between WCS firmware storage 24 and the CPU 12. Sixty-four control store bits (i.e., firmware word) plus a control signal flow from the WCS to the CPU on lines 90 and 92 respectively. The CPU next address generation signals (11 bits) on line 94 and the CPU master clock (for WCS timing) on line 64 are transmitted to the WCS from the CPU. The signals that make up the CPU/WCS interface will now be discussed. The master clock (timing) signal on line 64 is the basic CPU timing signal and is used to synchronize the CPU and WCS. Basic WCS timing signals are developed from this signal. The Next Address Generation signals (11 bits) on line 94 are the output of the CPU next address generation logic. Depending on the branch (BR) field of the firmware word and the mode of WCS operation, these interface signals can form the WCS RAM access address. When in WCS sequential mode, the low order bit (NAG011) is driven true whenever the CPU test logic determines a branch to the NA field address is required. CPU next address generation logic and test logic may be seen in U.S. Pat. No. 4,047,247, issued Sept. 6, 1977. The PROM Control Enable signal (PROMCE) on line 92 when true, indicates that the CPU PROM (CPU Firmware) is enabled and the WCS RAM (User's Firmware) is disabled. The WCS RAM Control Word (64 bits) on line 90 is the firmware control word read from the WCS RAM memory. When in sequential mode, the branch type codes stored in bits 49, 50 and 63, are interpreted by WCS logic and therefore are transmitted to the CPU as zeros. In transparent mode all 64 bits of the firmware control word are transmitted to the CPU unaltered.

The interface between the WCS and RAM memory contains all the data, address, and control signals necessary to store and retrieve firmware control words to and from RAM storage. The interface for each RAM memory 60 is essentially the same. Only the enable and availability signals differ depending on the physical position the RAM memory occupies in the WCS. The data and address signals for each RAM memory are wired together in the WCS. A description of the signals on the WCS/RAM interface is now provided. Two signals are used to select either the first RAM memory 60-1 or the second memory 60-2. Two signals are also provided to determine the type of RAM memory and two further signals are provided to determine if the particular RAM memory is installed. A data input word (16 bits) is sent to both RAM memories 60 as input write data. It is written into the enabled RAM at the location specified by the address input. An address input (10 bits) is sent to both RAM memories 60 and selects the location being read or written. This address is only relevant to the enabled RAM. A write word (four signals) specifies which word position of the addressed RAM location will be written into with the input data. Each signal controls one word position (16 bits) of the location to be loaded with the input data. These write signals feed both RAM memories, but only cause writes in the enabled RAM. A control word from RAM (64 signals) is the firmware control word read from the enabled RAM at the location specified by the address input. Since only one RAM is enabled at any time, the RAM output signals from the two RAM memories are wire-ORed together.

The system bus 14 is the common interface used by the CPU 12 and other units to communicate with each other. However, all bus operations involving the WCS 10 are only between the CPU and the WCS. The WCS does not communicate directly with any other unit. The CPU issues all WCS commands and associated data to the WCS over this bus, while the WCS only transfers data (in response to a command) to the CPU via the bus. All bus operations are on an asynchronous bus cycle basis. Each bus cycle has a master/slave relationship. The unit which transmits the information is always the master, the receiving unit is the slave. When a unit wishes to transfer information, it becomes the master by requesting a bus cycle. If no other unit with a higher priority is requesting a bus cycle it is granted to the master. When granted the cycle, the master unit places the slave unit channel number and data information on the bus. The slave unit recognizes its channel, receives the bus data and responds with the appropriate response signal. The response signal terminates the bus cycle.

The CPU can issue either input (read from the WCS) or output (write to the WCS) commands to the WCS. It requires two bus cycles to read information from the WCS. In the first cycle, the CPU is the master unit and issues the read command to the WCS requesting specific WCS data. In the second bus cycle, the WCS becomes the master and the requested data is transmitted to the CPU. For output type orders, only one bus cycle is required. For these output type commands the CPU is always the master and all required information is transferred to the WCS with the command.

The bus 14 contains 24 address lines. The master unit always supplies the channel number of the slave unit on address lines 8 through 17 and the command code on lines 18 through 23. Because all operations across the bus involving the WCS are only with the CPU to which the WCS is attached, the address bus will always contain either the CPU or WCS channel number. The channel number assignment for these units are directly related because of their close committed association. The last two bits of the WCS channel number are set to be the complement of the last two bits of the CPU channel. These bits are determined by switches located on the WCS 10.

The commands that the CPU can issue to the WCS are either output or input types. In the output type category are included the following commands: Initialize WCS (Function Code FC-01), Load WCS Address, Write RAM Word, WCS Entry and Return to PROM. In the input category are Read RAM Word, Input WCS Status and Input WCS I.D. A description of some of these commands is provided hereinafter. These commands are issued over the bus 14 by use of CPU firmware as a result of either a user-defined instruction or I/O instruction being extracted from main memory. If a WCS user-defined software instruction is extracted from main memory, CPU firmware generates an Entry command to the WCS. The first word (16 bits) of the software instruction is delivered to the WCS on the bus 14 data lines as a task word with the WCS channel number and the function code for the Entry Command on the address lines.

Figure 4:
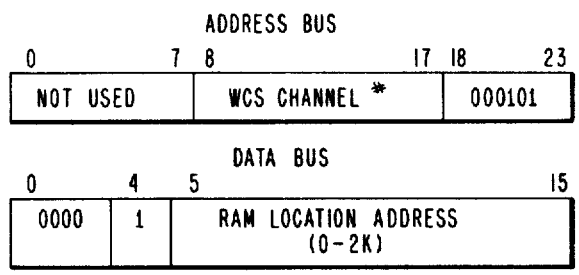
FIG. 4 illustrates the format for the load storage device (WCS) command used in conjunction with a storage device of the present invention.

The load WCS address command loads a WCS starting address into the WCS bus counter 68. This address is used to access WCS RAM by a succeeding read or write RAM word command. Each location in the WCS RAM is comprised of four 16 bit data word segments for a total of 64 bits. When an address is transferred to the WCS by this command, it points to the first 16 bit data word segment (i.e., left most 16 bits of 64). Subsequent read or write RAM word commands increment the segment pointer as well as the WCS RAM location address so that only one load WCS Address command is required to load any number of contiguous RAM storage locations. Four read or write RAM word commands transfer one 64 bit location. The bus format for the load WCS command is shown on FIG. 4. Bit 4 on the data bus must be a one to indicate a WCS RAM address.

Figure 5:
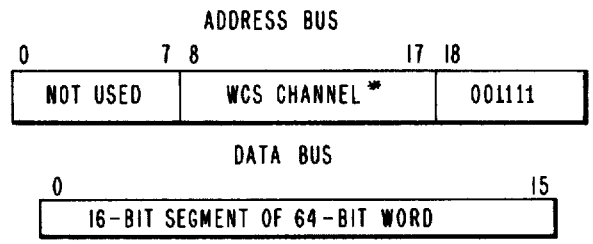
FIG. 5 illustrates the format for the write RAM word command used in conjunction with the storage device of the present invention.

The write RAM word command writes a 16 bit data word segment of the 64 bit firmware word in the current selected WCS RAM location. The selector is incremented after the transfer so a subsequent write RAM word command writes the next 16 bit data word segment of the same RAM location. If four write commands occurred to the same location, the entire firmware word is written and the location address is incremented. It is possible to increment the RAM location address beyond RAM capability. If this occurs, an error status bit 10 will set and the WCS issues NAK responses to subsequent Read/Write RAM word commands. The bus format for the Write RAM Word command is indicated in FIG. 5.

Figure 6:
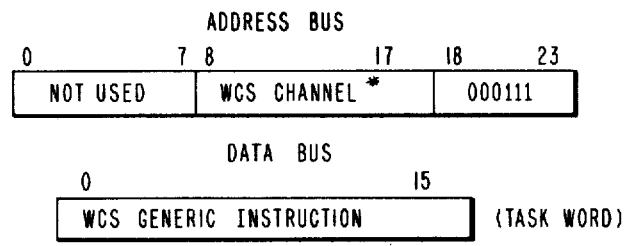
FIG. 6 illustrates the format for the WCS entry (splash branch) command used in conjunction with the storage device of the present invention.

The Entry command is generated when a user-defined instruction is extracted from memory. It causes hardware control to switch from standard instruction set firmware control to user firmware control. The instruction, extracted from memory by the CPU is used to select a specific entry point into the user coded firmware stored in the WCS. The bus format for the Entry Command is indicated in FIG. 6.

User-defined instruction codes in a selected range provide an entry point to one of the first 16 locations of the user firmware stored in the WCS. Upon the execution of the firmware word in WCS storage at the location selected as the entry point, user coded firmware gains control of CPU logic. Hardware control remains with the user coded firmware until a Return to PROM command is executed. The WCS will not accept an Entry command if an error status bit is stored in the WCS.

Figure 7:
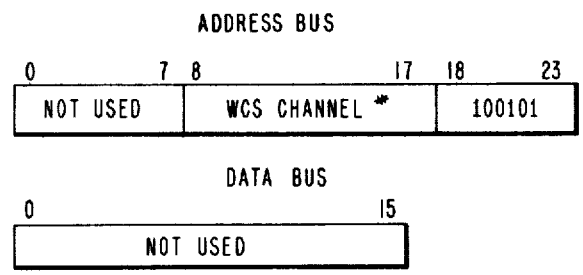
FIG. 7 illustrates the format for the return to PROM command used in conjunction with the storage device of the present invention.

The Return to PROM command code causes the CPU to revert back from user-coded firmware control to control by normal instruction set firmware stored in the CPU PROM. The destination address is determined by the output of CPU next address generation logic at the time this command is executed by the WCS. Normally this command is generated by the last command in a user firmware routine. The bus format for this command is indicated in FIG. 7.

Figure 8:
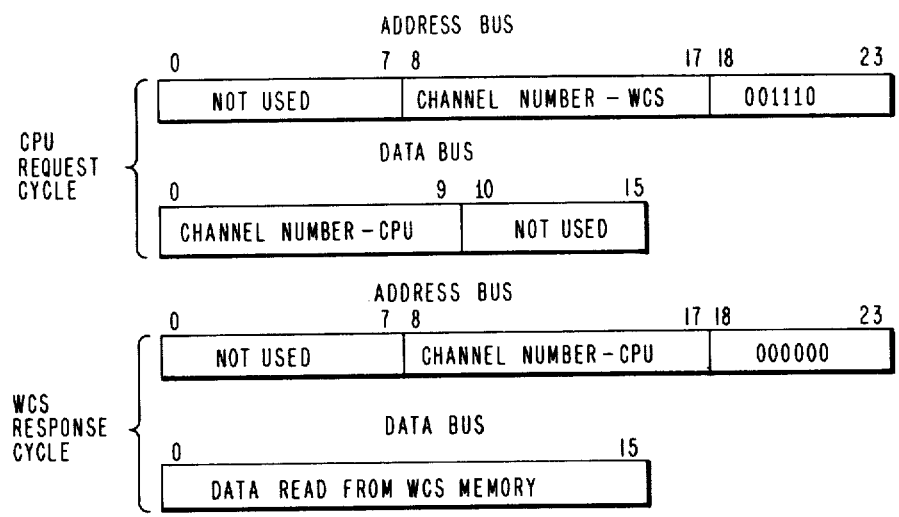
FIG. 8 illustrates the format of the read RAM word command, and response thereto, used in conjunction with the storage device of the present invention.

The read RAM word command causes one 16 bit data word segment of the selected firmware word in WCS storage to be transferred to the CPU. It requires two bus cycles to execute: first a request cycle, then a WCS response cycle. The formats for these cycles are shown in FIG. 8.

The WCS addressing of the firmware word is identical to that used by the Write RAM word command. After each 16 bit data word segment is transferred from the WCS, the segment pointer is incremented to the next 16 bit segment of the same firmware word. After the last (right-most) 16 bit segment is transferred, the address is incremented so as to point at the left-most 16 bit segment of the next firmware word location. It requires four read RAM word commands to transfer one firmware word location to the CPU. The CPU register or memory address to which the data word is transferred is specified by the CPU. The channel number transmitted over the bus 14 address lines during the response cycle is that of the CPU to which the WCS is attached. The channel assignment is determined by a switch as indicated hereinbefore.

Figure 9:
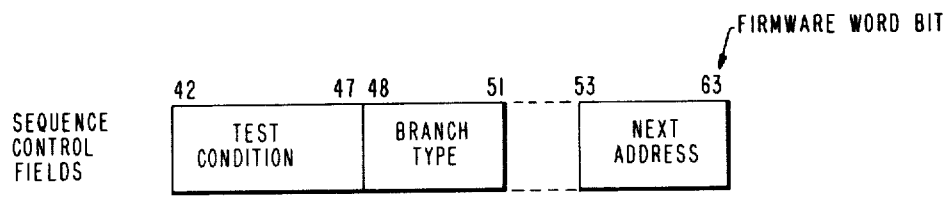
FIG. 9 illustrates three fields of a firmware word used in conjunction with the storage device of the present invention.

As indicated hereinbefore, there are two modes of WCS operation which determine how user firmware is interpreted and sequenced through execution; (1) Sequential Mode; (2) Transparent Mode. In both of these modes, three fields of the firmware word specify the address of the next firmware word to be executed as shown in FIG. 9.

In sequential mode, WCS logic, in conjunction with CPU logic, interpret these fields to determine the next firmware address. In transparent mode, the user firmware word is interpreted entirely by CPU logic and the next firmware address is generated by normal CPU next address generation (NAG) logic. Selection of which mode of operation is active is determined by a switch 95 (FIG. 3) located in the WCS. The mode selected by the switch becomes effective after an Entry to the user firmware is executed.

When sequential mode is selected by the switch 95, three bits 49, 50 and 63 of the user firmware word are driven false as they are delivered to the CPU. WCS logic stores the NA field and interprets branch type code bits 49 and 50 to determine where the next firmware address is selected from. The remaining portion of the user firmware word is delivered to the CPU. If CPU logic determines a branch condition is met, it raises NAG bit 11 to inform the WCS to select the stored NA field in jump address register 78 as the next address.

During sequential mode operation, all sequence changes (i.e., jumps or branches) are permanent in that the WCS Increment Address Counter (MCNT) 70 is loaded with the address of each executed firmware word and succeeding addresses are derived by incrementing this counter 70. Subroutine entry and return are facilitated by an operation which stores the incremented value of MCNT counter 70 in a WCS Return From Subroutine register (RSBA) 72. When a return is made back to the calling routine, the RSBA register 72 is used to access user firmware so that the control resumes at the firmware word following the calling subroutine firmware words. The RSBA register 72 is not used by firmware stored in the CPU. WCS Sequential Mode of processing is only possible on the user coded firmware stored in the WCS.

In the transparent mode, the branch type codes are not interpreted by the WCS. The entire user firmware word (64 bits) is transferred to the CPU 12 unaltered. All next firmware addresses are generated by CPU next address generation (NAG) logic. The CPU next address generation output is always transmitted back to the WCS 10 and selected to address user coded firmware.

Thus, the WCS 10 enables execution of user coded firmware that tailors hardware operations to the specific needs of the user. This user firmware is stored in the WCS under CPU system control and augments the standard CPU instruction set firmware. Once loaded, software can be used to invoke the specialized firmware via user-defined instructions, causing the hardware control to switch from standard CPU firmware control to user (WCS) firmware control. The user coded firmware is executed either in sequential mode or transparent mode until such time as the user firmware returns control to the standard CPU firmware or a major error (e.g., memory parity) is detected.

Figure 10:
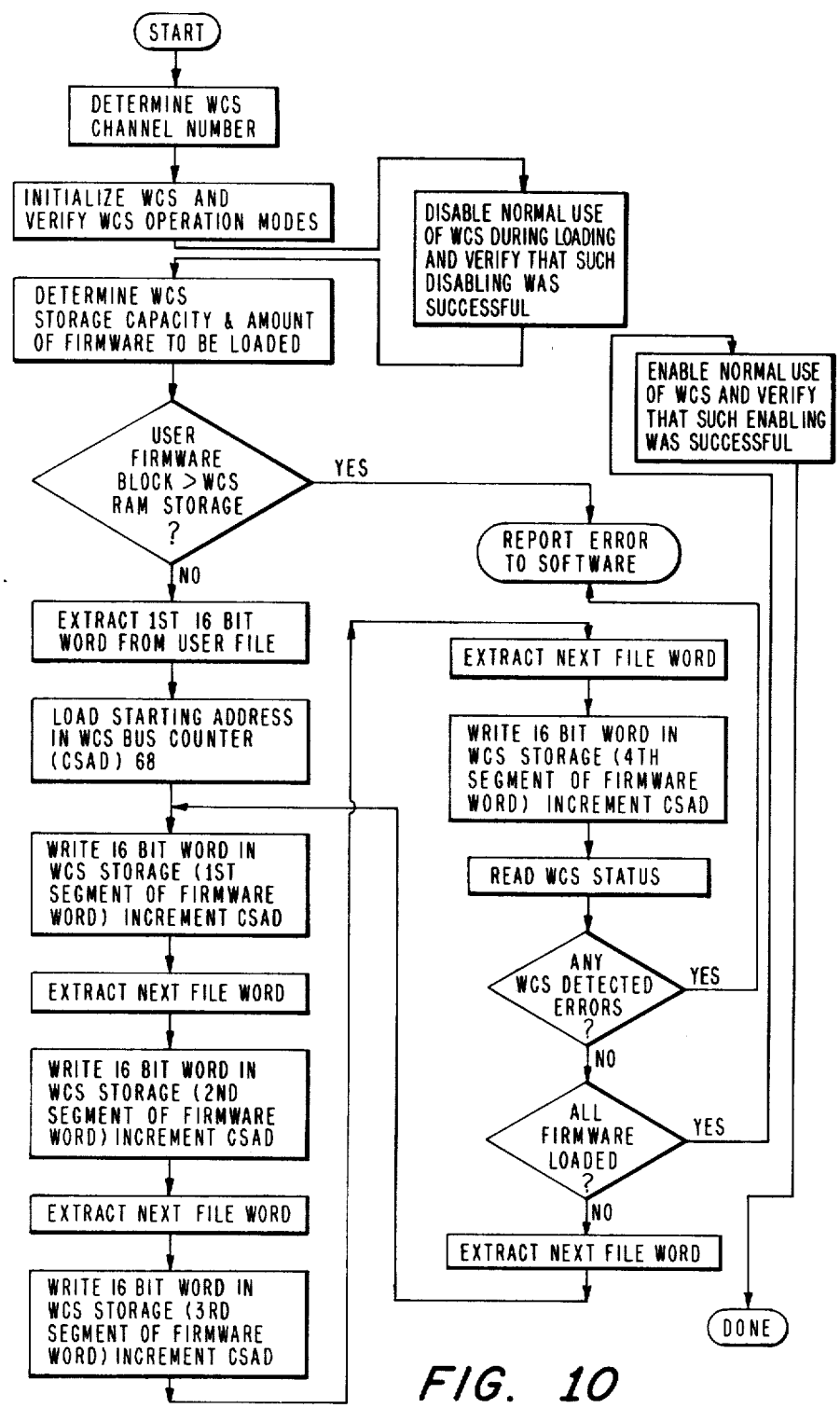
FIG. 10 illustrates a typical loading sequence used in conjunction with the storage device of the present invention.

The WCS 10 is loaded with user firmware by system software. Normally at system start-up time, a WCS loader program is called and preconditioned to transfer a previously stored user firmware file into WCS storage 24. Then subsequent software or operator actions can recall the loader and cause other firmware files to be loaded in the WCS. In all cases, the loader is supplied with the WCS location address where loading is to start and the size of the firmware block to be loaded. A typical WCS loading sequence is shown in FIG. 10 and described below. Initially the WCS channel number can be determined by issuing an input ID command to each channel. Once the channel is established, the WCS is initialized and the WCS modes of operation are verified by a status read. At this point the number of RAM memories installed is determined by issuing a read RAM word followed by a status read command to each RAM memory. The results are compared with the size of the firmware block. An error is reported to system software if not enough RAM storage is available to store the firmware block. If sufficient WCS RAM storage is available, the first (left-most) 16 bit word of the user firmware file is extracted and the start WCS load address is transferred to the WCS bus address counter 68. After the address is loaded in the WCS, the write loop begins. Each write transfers the 16 bit word extracted from the firmware file to the WCS and increments the WCS bus counter (CSAD) 68. The bus counter 68 always points to the 16 bit segment of the RAM location that is to be written. After four writes this counter increments the RAM location address. Between successive writes, the next succeeding 16 bit data word of the file is extracted. It requires four writes to store one RAM location. After four writes have occurred, WCS status is read so WCS detected errors can be reported to the CPU. If no errors are reported and loader software determines the full firmware block was loaded, the operation is complete. Otherwise, the write loop is entered again and the next RAM location is loaded.

Execution of system software including loading the WCS with user coded firmware is performed by the CPU executing standard firmware routines permanently stored in the CPU PROMs. Switching to user coded firmware for CPU execution can only be accomplished by executing a user-defined software instruction. When a user-defined software instruction is extracted from main memory 18, a permanently stored CPU firmware routine is executed which results in an Entry command being issued over the bus 14 to the WCS 10. When the WCS accepts the command, it disables the CPU firmware and enables user coded firmware stored in the WCS. The specific entry point in user coded firmware is determined by the op-code of the instruction. Once enabled, user coded firmware is transmitted via the private WCS/CPU interface 16 for CPU execution. Control of the CPU logic is switched from the permanently stored firmware stored in the CPU to the user coded firmware stored in the WCS. Return to CPU firmware control is determined by user coded firmware.

When user coded firmware processing is complete and return to CPU filmware control is desired, a user coded exit firmware routine is executed which results in a return to PROM command being issued to the WCS over the bus 14. When the WCS accepts the command it disables the transmission of user coded firmware to the CPU and enables the firmware permanently stored in the CPU. Control of CPU logic is thus returned to the firmware stored in CPU PROM. The user can code a return to any location in CPU firmware. However, normally, the first location of instruction processing will be selected as the return point.

When user coded firmware is being executed, access to the permanent firmware in the CPU is inhibited unless a major error is detected. The CPU upon detecting a major error such as a bus parity error or uncorrected memory error will force an address of zero on the next address generation lines (NAG) to the WCS. If this address is detected while the WCS sequential mode is active, WCS logic disables the user coded firmware. The CPU filmware gains control and a branch to location zero of CPU firmware occurs regardless of user firmware coding. If an illegal branch code is detected when executing user coded firmware in the WCS sequence mode, WCS logic inhibits the reading of the user firmware word causing the NA address to appear as all zeros. The CPU next address generation lines are zero resulting in the WCS returning firmware control to the CPU at location zero.

The following description makes reference to various figures which illustrate flow charts that show the sequence of events and major control signals generated for certain commands that can be issued to the WCS 10. Each flow chart is divided into a CPU side and WCS side in order to show the interaction between these two units. A process block on the CPU side can designate either a firmware controlled process or a hardware action. The actions indicated in CPU process blocks are general in nature. The process blocks of the WCS side indicate WCS hardware operation. A detailed description of WCS hardware pertinent to the present invention is provided hereinafter.

The flow charts show the formats of the software instruction and resulting bus cycles that execute the command where applicable. Due to the asynchronous nature of the bus 14, some events in the WCS and CPU occur in parallel. The flow charts show this, but since there is no guarantee when these events occur, the flow charts show only the sequence of events that occur in each unit and process blocks that describe possible simultaneous actions are not necessarily aligned.

Figure 11:
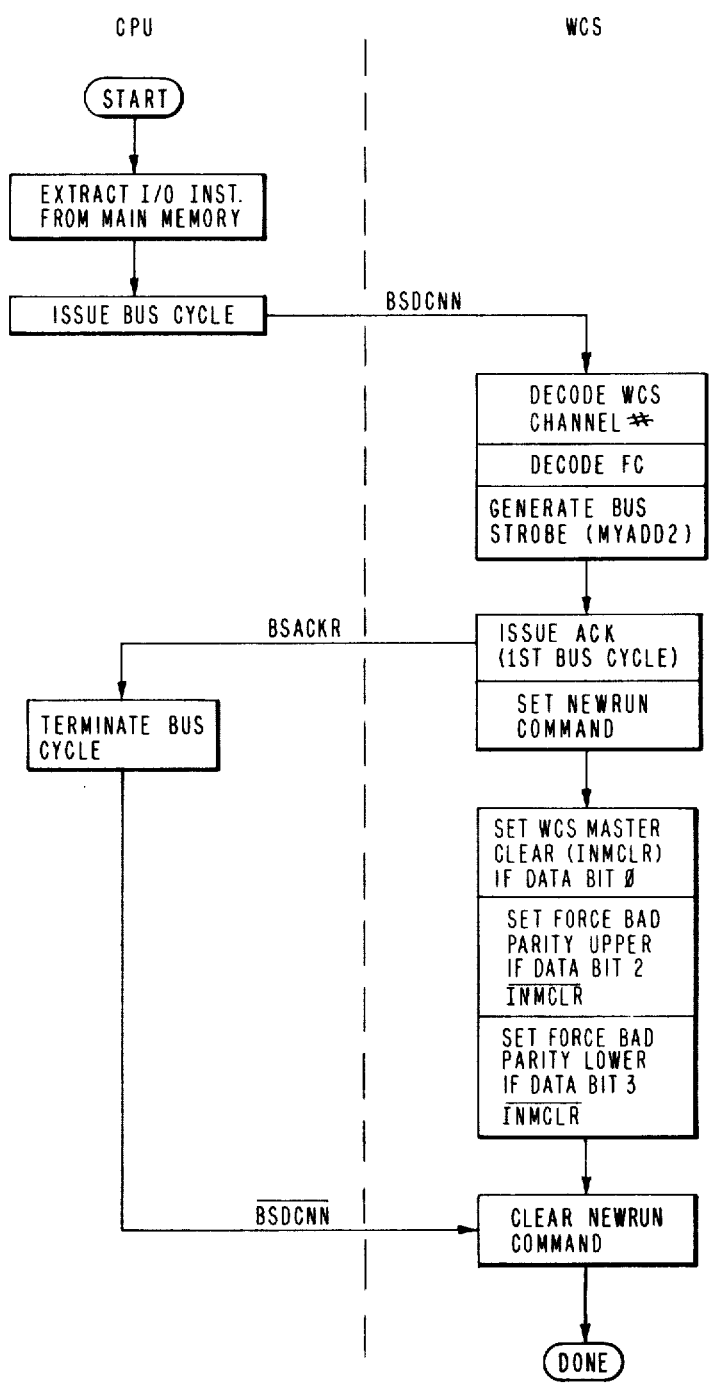
FIGS. 11 through 16 illustrate flow charts of various commands used in conjunction with the storage device of the present invention.
Figure 12:
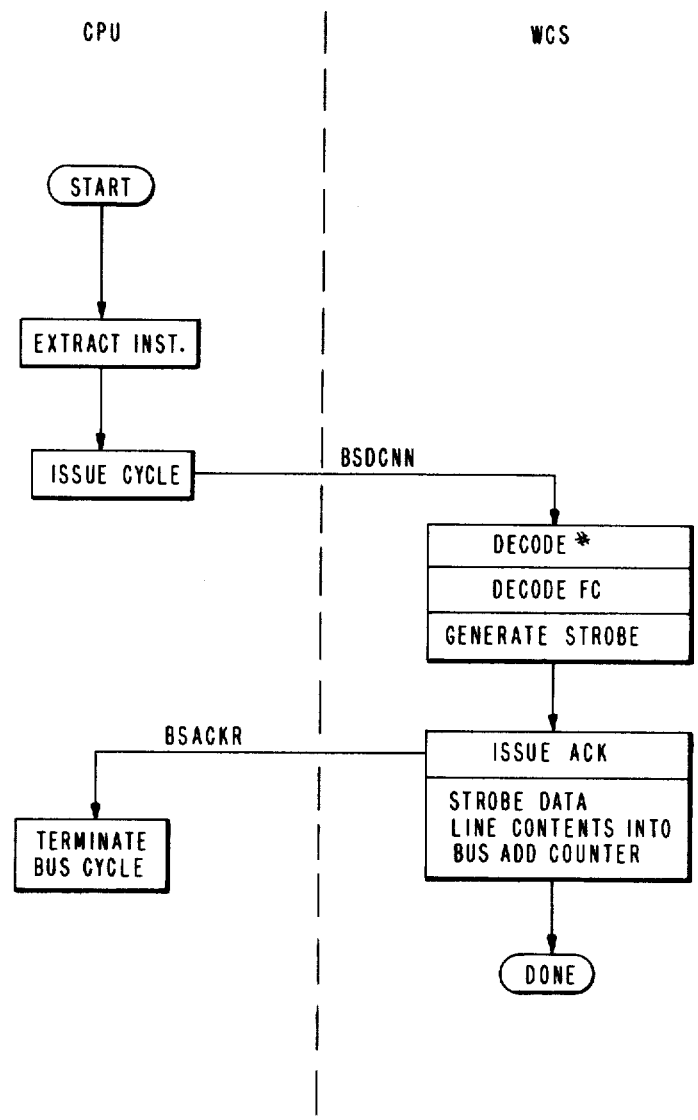
Figure 13:
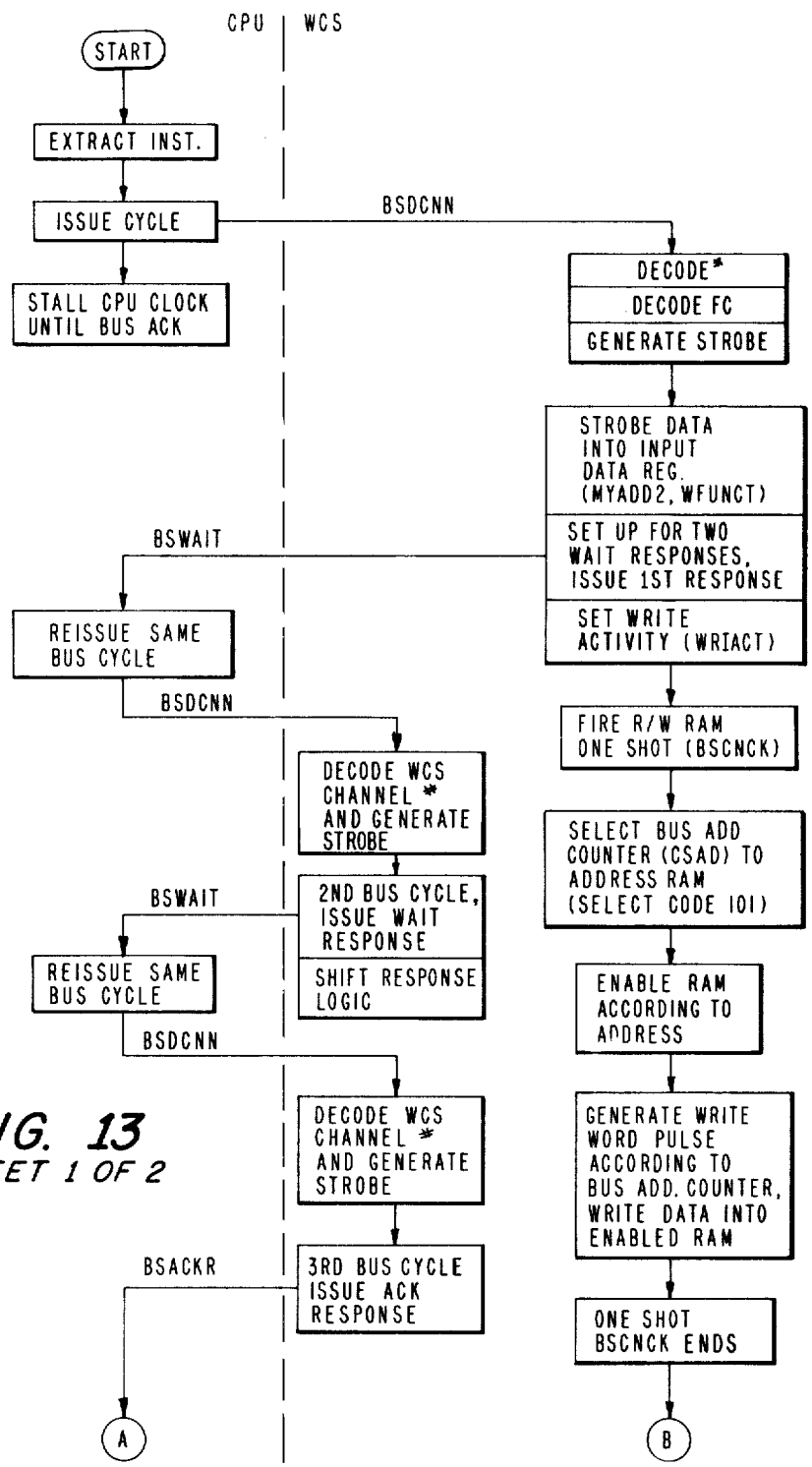
Figure 13:
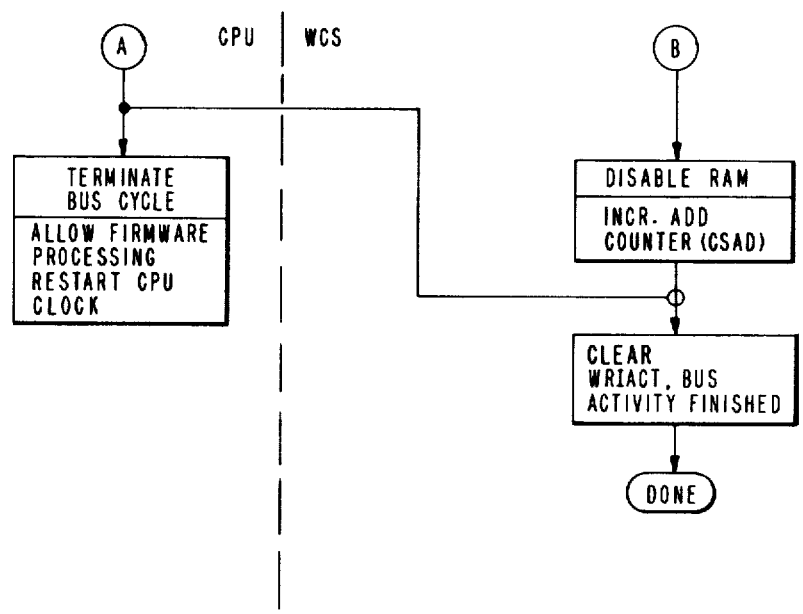
Figure 14:
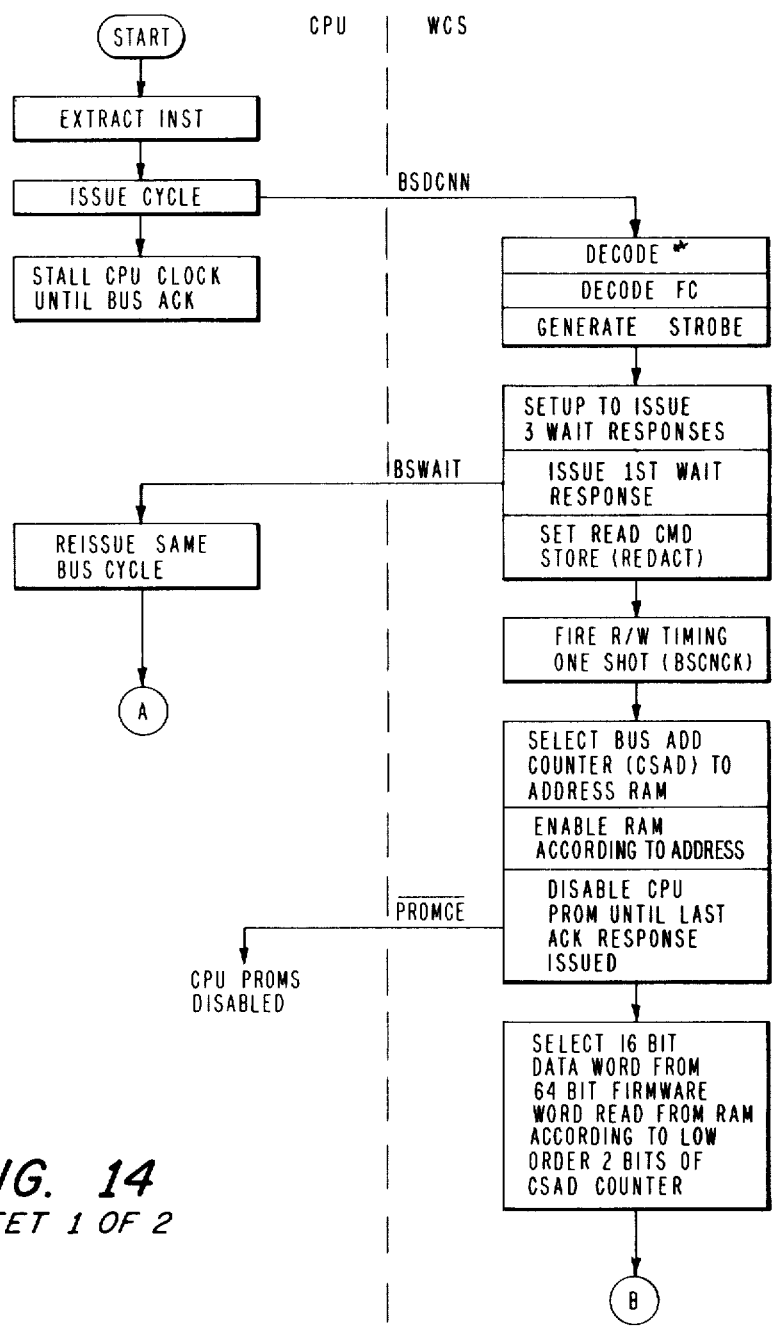
Figure 14:
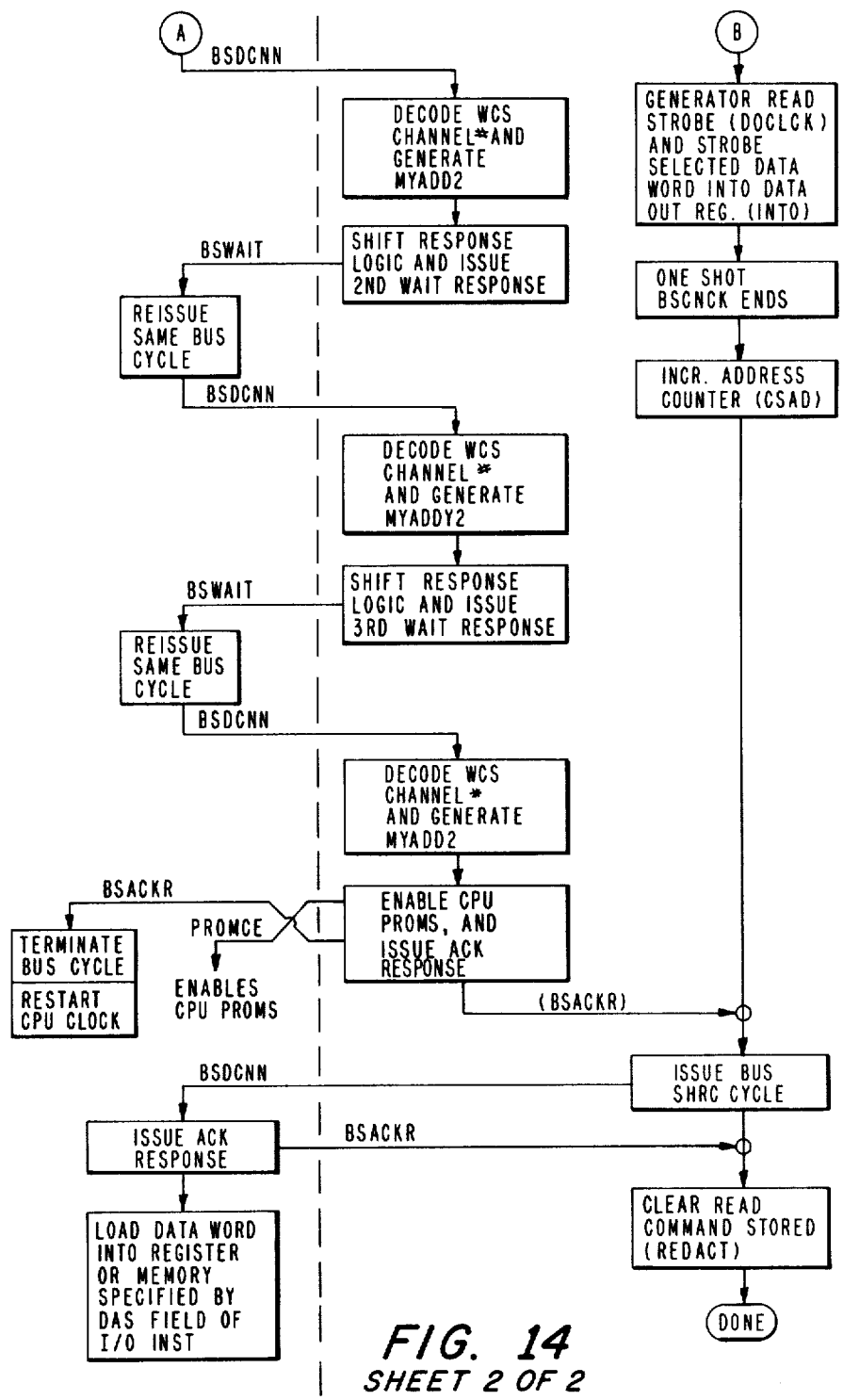
Figure 15:
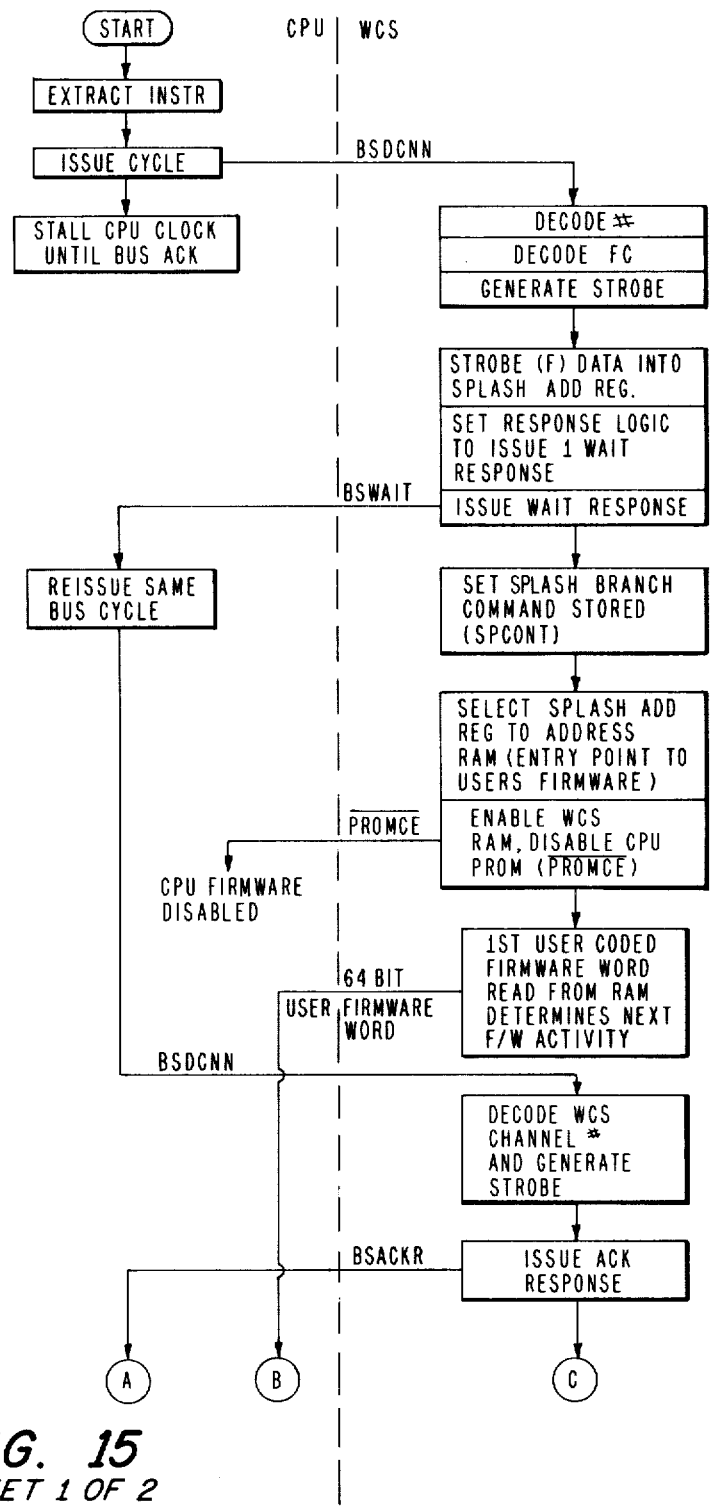
Figure 15:
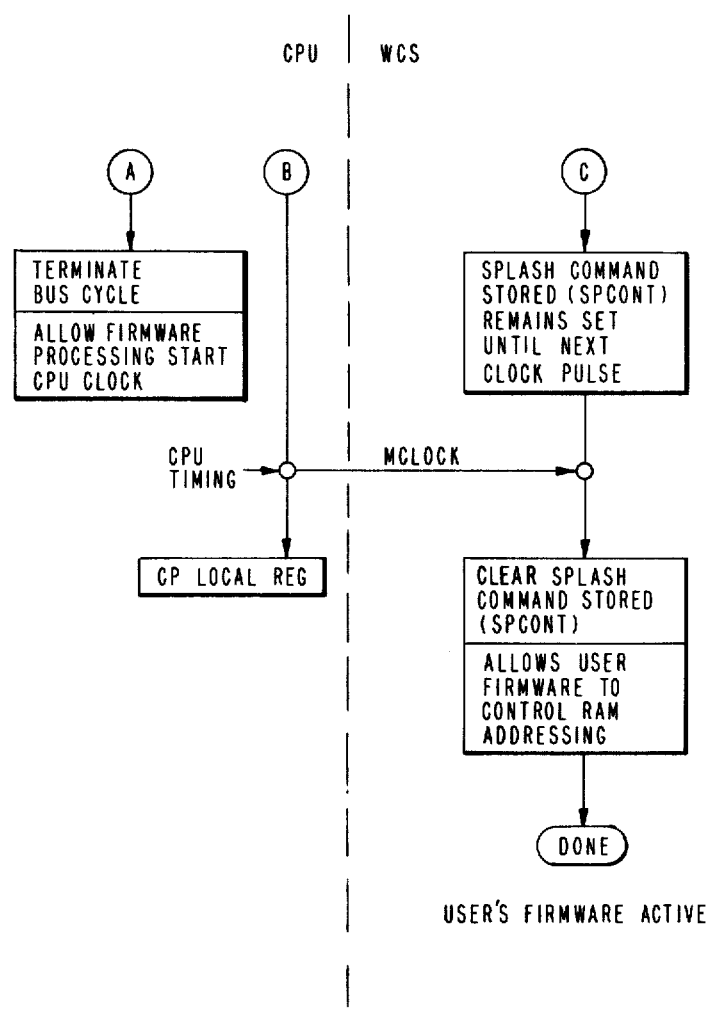
Figure 16:
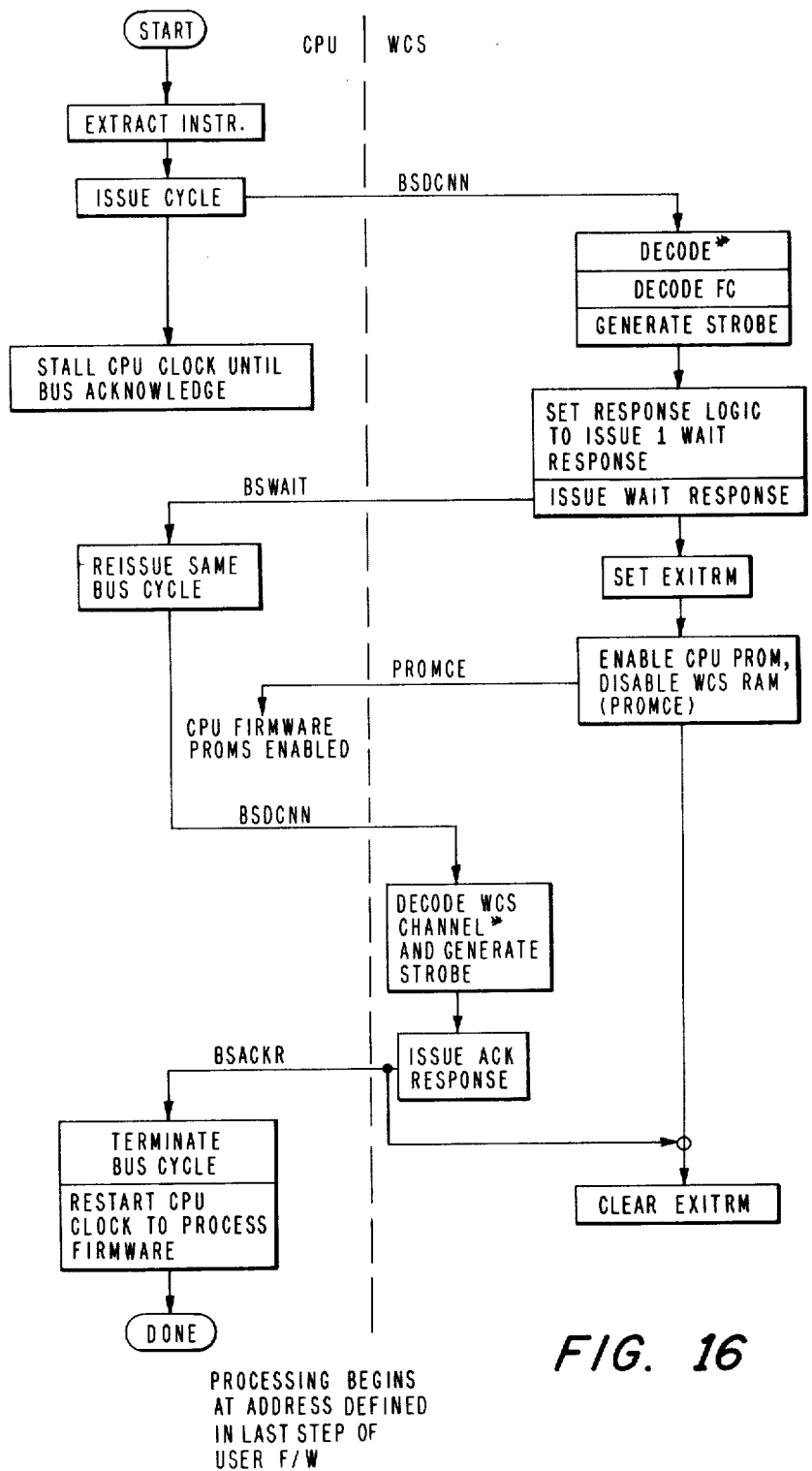

The self-explanatory flow charts for the WCS commands are shown in FIGS. 15 through 22. The figures and associated command flow are as follows:

FIG. 11 WCS Initialize Command Flow,
FIG. 12 Load WCS Address Command Flow
FIG. 13 Write RAM Word Command Flow,
FIG. 14 Read RAM Word Command Flow,
FIG. 15 Entry Command Flow, and
FIG. 16 Return To PROM Command Flow.

Although such flow charts of FIGS. 11 through 16 are self-explanatory, a general description of such figures shall now be made. The sequence in both the CPU and the WCS for each of the command codes illustrated in FIGS. 11 through 16 are to some extent similar in that initially, after the start box, the instruction is extracted from the main memory 18, following which a bus cycle is issued. Having obtained the bus cycle, the CPU as indicated by the so-called BSDCNN signal transfers the channel number to the WCS. The signals, such as BSDCNN, BSACKR, etc., as shown in these Figures, are fully explained in the aforementioned U.S. Pat. No. 3,993,981, issued on Nov. 23, 1976. In turn, the channel number is decoded by the WCS, the function code of the command issued by the CPU is decoded by command decoder 34, and a strobe is generated indicating that this was "my" address, in response to which an acknowledge signal is issued by the WCS in the form of an ACK signal thereby terminating the bus cycle by the CPU. In parallel with the above operation, a new run command is generated within the WCS. The above description up to the point of issuing the acknowledge signal to the CPU as indicated hereinbefore is similar for each of the Figures. The remaining portions of the flow indicated in the Figures is generally specific to each command flow.

Basically, the initialize command flow of FIG. 11 is utilized to clear the WCS logic and to initialize the parity bistable elements, following which parity checking is allowed. In FIG. 12, basically, after the acknowledge signal is issued to the CPU thereby terminating the bus cycle, the purpose is to strobe the data line contents into the bus address counter 68. As illustrated in FIG. 13, the write RAM word command flow basically provides that the data be strobed into the input data register and that two wait responses be set up and the first issued and, in parallel, the CPU stalls its clock until there is an acknowledge signal received from the WCS. The purpose of stalling and issuing the wait signals to the CPU is to give the system enough time to accommodate the various transfers and logical operations which are taking place. For example, during the initialize command flow, as seen in FIG. 11, no wait responses or stalling are necessary, since, in fact, this command does not require extra time for its operation. On the other hand, some operations take up to three such stalling operations in order to accommodate the time required for such logical operations. The entry and exit RAM command flows require one stall operation, and the read RAM operation requires three such stall operations.

As just discussed, the write RAM operation requires two such stall operations. Thus, in response to the wait signal, the CPU reissues the bus cycle and in parallel therewith, the WCS provides the operation indicated. More particularly, the various write logic is set for operation, following which the bus address counter 68 is selected to address the RAM and the RAM is enabled according to the address so provided. In parallel, the WCS receives from the CPU the BSDCNN signal via bus 14, in response to which the channel number is again decoded and another wait signal is issued to the CPU. Again, the same bus cycle is reissued by the CPU. After decoding the channel number for the third time, an ACK response is provided to the CPU by the WCS. In parallel, the data is written into the enabled RAM following which it is disabled and the increment address counter 70 is incremented.

FIG. 14 illustrates the flow diagram for the read RAM word command. As indicated hereinbefore, during such command, three wait responses are issued as shown in the flow diagram and function in a manner similar to those for the write RAM word command except that there is one extra wait, i.e., there is one extra reissue of the bus cycle by the CPU. During the time that these so-called stall operations are taking place, the WCS selects the bus address counter 68 to address the RAM and the CPU PROM is disabled. Further, the 16 bit data word is selected from the firmware word which is to be read out and the selected data word is strobed into the data output register 84, following which the increment address counter 70 is incremented. During this time, as indicated hereinbefore, the additional wait responses are provided to the CPU which as for the write command requires a shifting of certain information in the so-called shift response logic as shall hereinafter be discussed. Following an ACK response, the WCS issues a so-called second half read cycle, during which time the WCS gains access to the bus by issuing its BSDCNN signal on the bus to which the CPU issues an acknowledge response and loads the data word into the register or memory specified in the CPU.

The Entry command flow is shown in FIG. 15. As indicated hereinbefore, only one stall by use of one wait response is required in order to provide sufficient time for the logical operations utilized in conjunction with such Entry command. Initially the data is strobed into the splash address register 66 following which the first and only wait response for this command is issued. The splash address register is then selected to address the RAM and the WCS RAM is then enabled and the CPU PROM is disabled. The first user coded firmware word is then read from the RAM and determines the next RAM address. This 64 bit word is provided to the CPU and is strobed into a local register in the CPU for use by the CPU. In parallel, the same bus cycle is reissued by the CPU and the channel number is decoded by the WCS, after which the ACK response is generated by the WCS thereby terminating the bus cycle in response to the ACK response from the WCS. The Entry command is stored and remains until the next clock cycle following which it is discarded. This then allows the user firmware to control the RAM addressing function. During the return to PROM command, as shown in FIG. 16, one wait response is all that is needed. During the time that the CPU reissues the same bus cycle, the CPU PROM is enabled and the WCS RAM is disabled. Upon the decoding of the channel number, the WCS then issues an ACK response and this terminates the bus cycle. Processing then begins in the CPU at the address forced into the next address generation logic of the CPU during the time that the first bus cycle was issued by the CPU. This is accomplished as indicated in the diagram just after the first bus cycle is issued.

Figure 17:
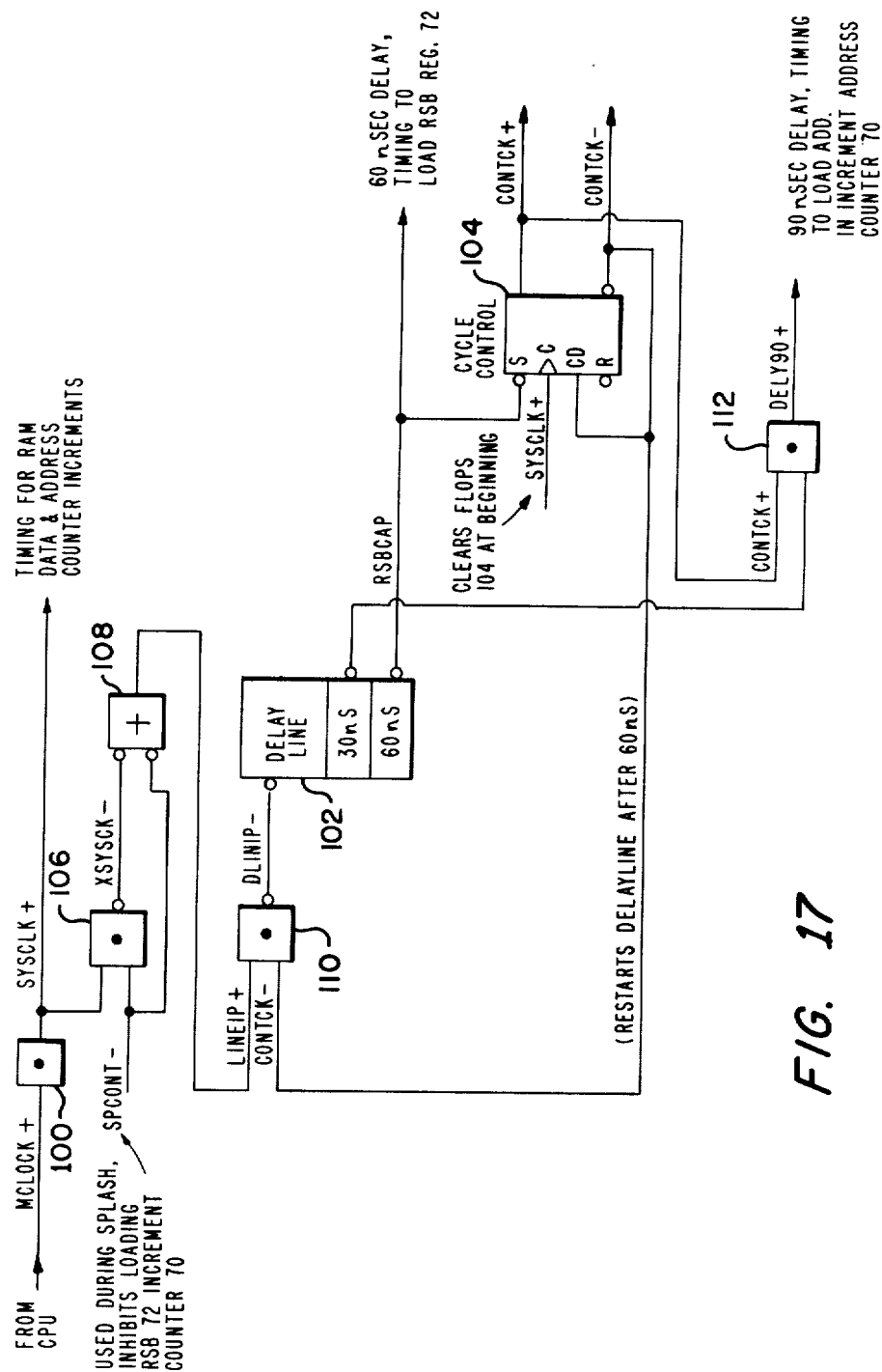
FIG. 17 illustrates the logic used to provide the basic timing for the storage device of the present invention.

We shall now discuss the basic WCS clock and the extended CPU cycle timing. Basic WCS timing is developed from the CPU master clock signal (MCLOCK+) on line 64 which is transmitted to the WCS via the WCS/CPU private interface 16. Three basic WCS clock signals are generated: SYSCLK, RSBCAP, DELY90. These clock signals insure WCS and CPU operations are synchronized. FIG. 17 shows the logic for generating these WCS signals.

The SYSCLK signal is the primary WCS timing signal. It is directly generated via buffer 100 and therefore follows exactly the CPU master clock signal MCLOCK+. This primary WCS signal is used to: generate the other basic clock signals, to store NA and BR fields of the control word read from RAM and to increment the increment address counter (MCNT) 70.

The RSBCAP signal is generated 60 nanoseconds after primary signal SYSCLK+ via a delay line (RSBCAP−) 102. Its primary purpose is to clock incremented addresses from the Increment Address Counter (MCNT) 70 into the Return From Subroutine Address register (RSBA) 72. RSBCAP also sets cycle control flop (CONTCK) 104 which in turn, via OR gate 110, restarts the delay line 102 and enables a 90 nanosecond delayed signal for loading the MCNT counter 70. If however, an Entry command is stored (SPCONT), the initial input to the delay line (LINEIP), is disabled via logic elements, AND gate 106 and OR gate 108. (It is noted that the various gates shown in the Figures are referenced simply as either AND or OR gates but may be for example NAND or NOR gates respectively). RSBCAP− will not be generated, therefore preventing loading of the RSBA register 72 and MCNT counter 70.

The DELY90+ signal is generated, via OR gate 112, 90 nanoseconds after primary clock signal SYSCLK+ and only if an Entry command is not stored. Its purpose is to clock the address used to access RAM 24 into the Increment Address Counter (MCNT) 70.

Figure 18:
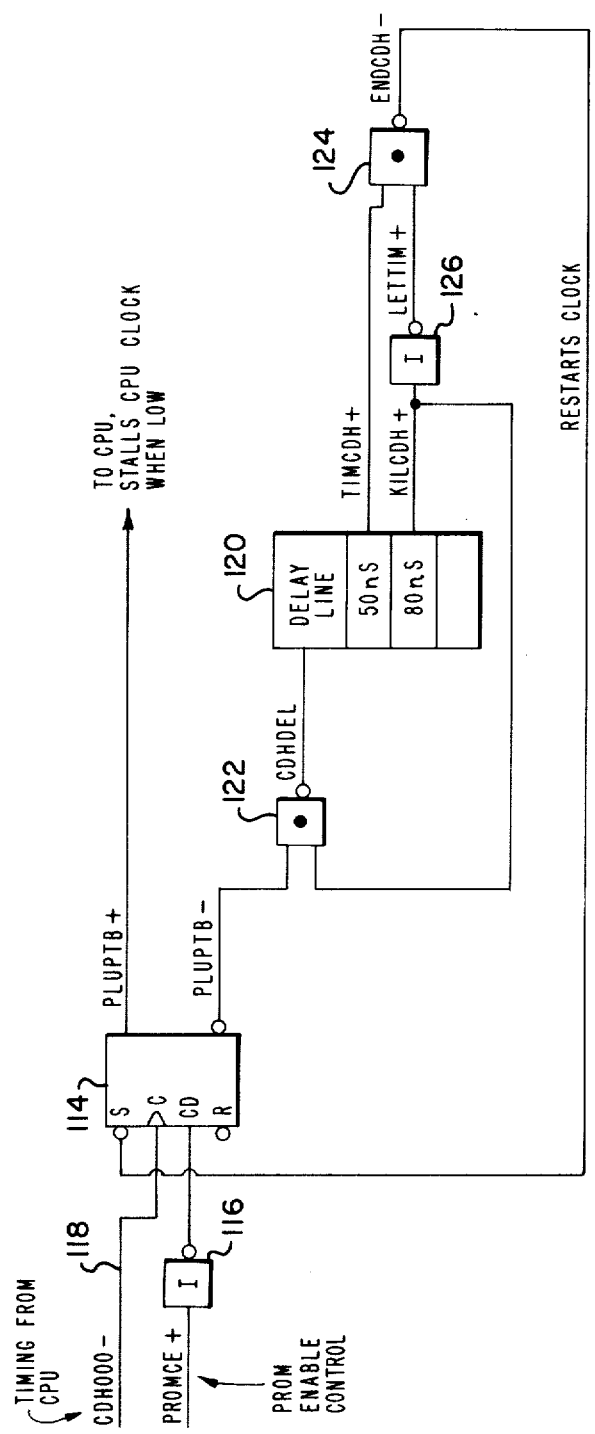
FIG. 18 illustrates the logic used for extended CPU cycles generated in conjunction with the storage device of the present invention.

When the WCS RAM memory 24 is enabled (user firmware active), each CPU firmware cycle is extended an additional 80 nanoseconds. This is accomplished as shown in FIG. 18 by stalling the CPU clock 80 nanoseconds during each CPU cycle. The CPU clock is inhibited when signal PLUPTB is driven false. When the test device 26 is installed, this signal is generated in the test device and is used to stop and start the CPU clock. When the test device is not installed, a flip flop PLUPTB 114 located in the WCS is used to extend the CPU cycle. The extended cycle is developed by clearing PLUPTB flop 114 for 80 nanoseconds of each CPU cycle. When PROMCE at the input of inverter 116 is false (RAM is enabled), CPU timing signal CDHOOO− on line 118 clocks PLUPTB flop 114 false. This starts an 80 nsec delay line (KILCDH+) 120 via OR gate 122. PLUPTB flop 114 remains cleared, therefore stalling the CPU clock until the 80 nanoseconds delay has expired. At the end of the delay, ENDCDH via inverter 126 and OR gate 124 becomes true and forces PLUPTB flop 114 true, restarting the CPU clock. The CPU cycle is extended each time the CDHOOO signal is generated until the CPU firmware again gains control as signaled by PROMCE true.

Figure 19:
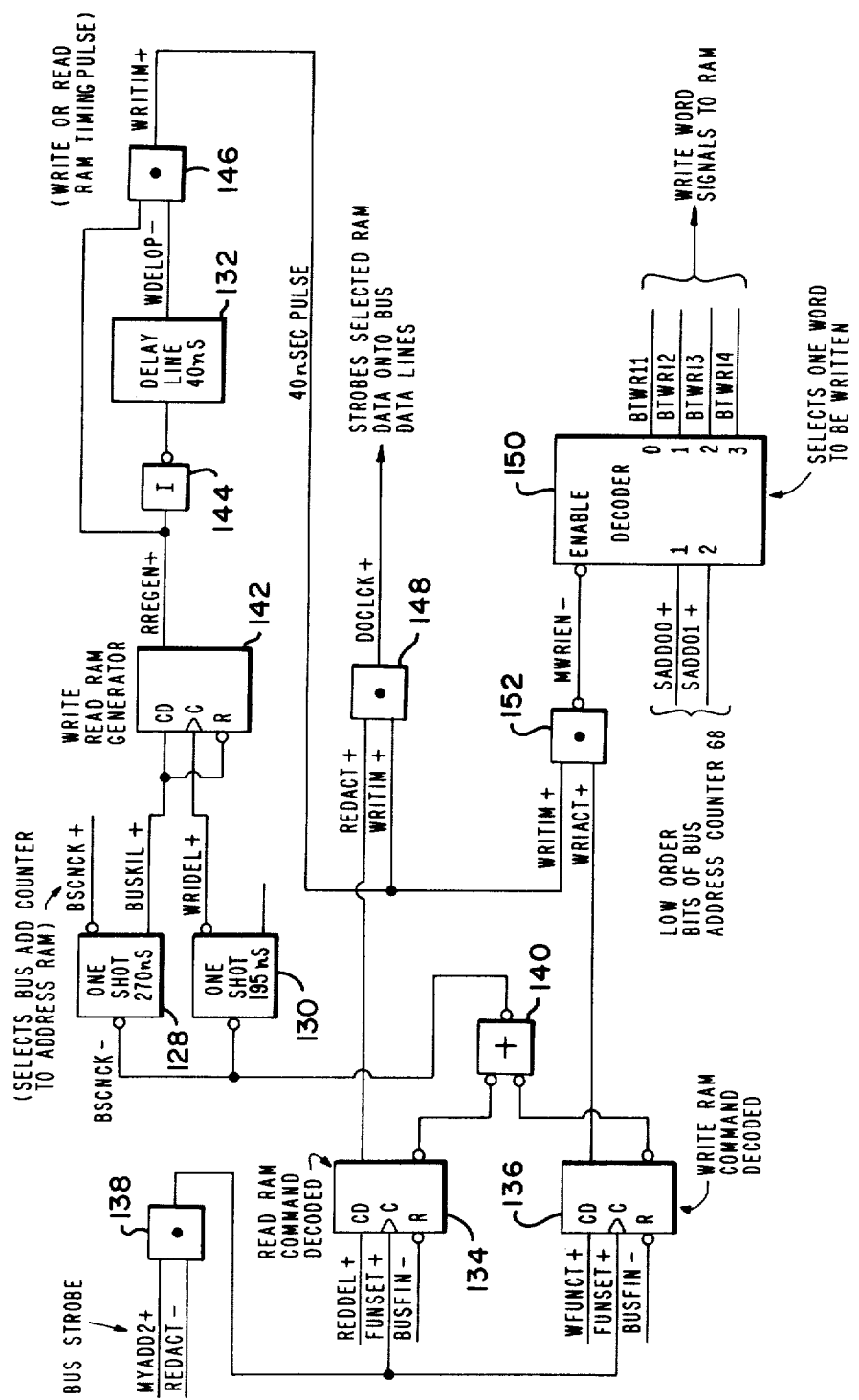
FIG. 19 illustrates the RAM Read/Write timing logic used in conjunction with the storage device of the present invention.

When either a Read RAM or Write RAM command is issued to the WCS, a read/write strobe pulse (WRITIM) is generated. This strobe is necessary because of the asynchronous nature of the bus 14 and to insure WCS addressing and output selection logic have settled before strobing data into RAM or onto the bus 14. However, no special timing is generated for a firmware word read from RAM which is directly sent to the CPU 12 via the private WCS/CPU interface 16. In this case, the normal CPU control store strobe (MCLOCK) is used. The Read/Write command timing is developed by two one-shot multivibrators (BUSKIL 128 and WRIDEL 130) and a delay line (WDELOP) 132 as shown in FIG. 19. If either a read or write RAM command is stored in flip-flops 134 or 136 respectively at bus strobe time (MYADD2) at the input of AND gate 138, both one-shots (BUSKIL, WRIDEL) are fired via OR gate 140. The BUSKIL signal and its negation (BSCNCK+) force the bus address counter 68 to be selected to address RAM. 195 nanoseconds later, WRIDEL 130 relaxes, causing the WRITIM signal, via flip-flop 142 and inverter 144, at the output of AND gate 146, to pulse true for the duration (40 nsec) of the delay line 132. This 40 nanosecond strobe pulse causes DOCLCK to be generated at the output of AND gate 148 if a read command is stored, or it enables the write pulse decoder 150 via AND gate 152 if a write command is stored. The decoder 150, which is included in write control logic 89, generates one of four possible write word pulses (BTWRI1-4) as determined by the low order address bits (SADD00, SADD01) stored in the bus address counter 68. At the end of 270 nanoseconds, one-shot (BUSKIL/BSCNCK) 128 relaxes, enabling the bus address counter 68 to increment to the next word address.

Figure 20:
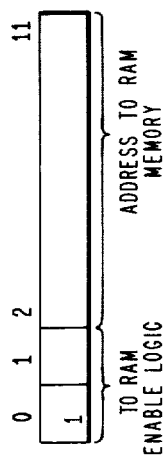
FIG. 20 illustrates the format of the address used to access information in the storage device of the present invention.
Figure 21:
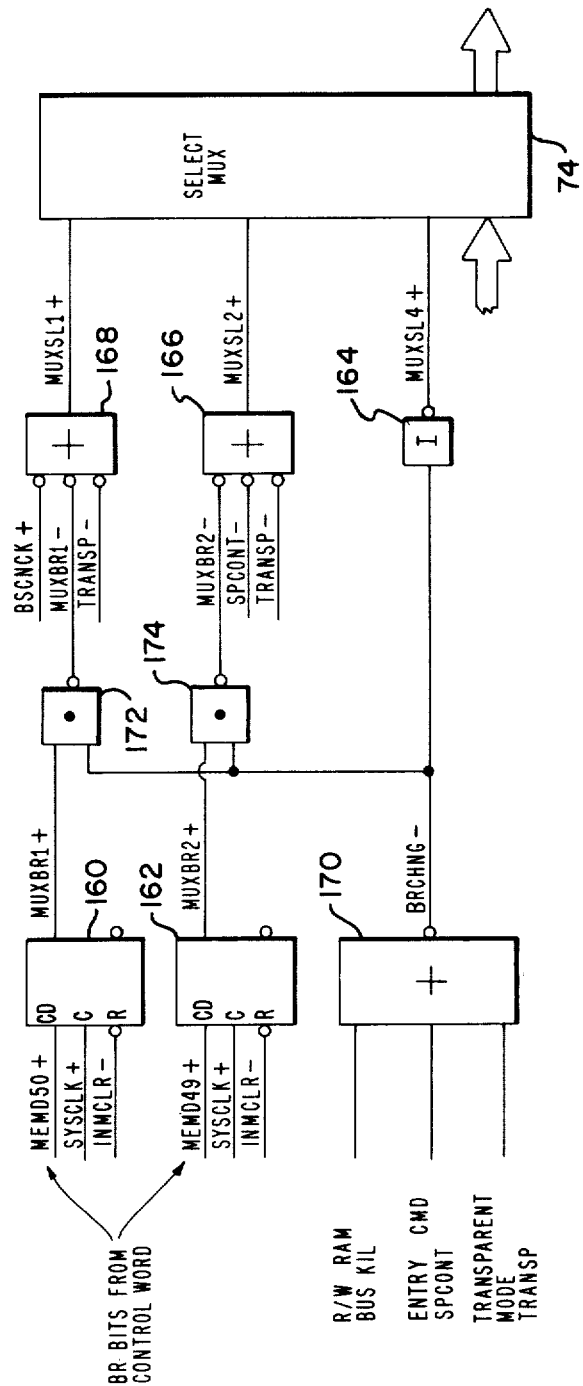
FIG. 21 illustrates the logic of the multiplexer control logic used in conjunction with the storage device of the present invention.

To access the WCS random access memory the address must be in the format indicated in FIG. 20. Bit 0 of the RAM address must be a one and indicates this is a WCS RAM address. It is the user's responsibility to insure bit 0 is high in any start address initially loaded in the bus address counter 68 (via a load WCS command) and in all RAM addresses coded in the next address (NA) field of any user's firmware words. WCS logic is utilized to force bit 0 high when user firmware is active or when an Entry command is executed. Bits 0 and 1 are used to enable the RAM 24. If Bit 0 is zero, both RAM memories are disabled. Bit 1 determines which RAM memory is enabled (i.e., bit 1 low enables memory number 1, bit 1 high enables memory number 2). Bits 2 through 11 are the access address sent to the RAM memories. WCS logic selects and delivers the RAM address to the RAM memories. The delivered address is selected by two addresses MUXs; Direct Address (DADD) 76 and Select Address (SELA) 74 as shown in FIG. 3. This selected address can come from the CPU next address generation (NAG) logic, or certain registers and counters located in the WCS as shown in FIG. 3.

The Direct Address MUX (DADD) 76 selects the final address delivered to the RAM memories. This address can be selected from either the output of the Jump Address register (JADD) 78 which stores the NA field of the firmware word, or the output of the Select Address MUX (SELA) 74 which selects addresses from one of several sources. The Jump Address register 78 is only selected if the WCS is in sequential mode and a branch to the NA field is required. In all other cases the output of the SELA MUX 74 is selected. DADD MUX 76 selection is determined by the lowest order bit of the next address received on line 94.

The address selected by such low order bit received on line 94 is primarily controlled by CPU firmware test logic. During each firmware cycle, the BR (Branch Code) and the TC (Test Condition) fields of the addressed firmware word are examined by normal CPU firmware test logic. If this CPU logic determines a branch to the NA field is required, it informs the WCS by forcing CPU signal NAG011 on line 90 true. Also see FIG. 21. The Jump Address register is thus selected for the output of DADD MUX 76. However, if a link type branch is decoded from the firmware word or the WCS is in transparent mode, the SELA MUX 74 output is selected to address RAM regardless of the output of CPU test logic.

To insure stability of the DADD MUX 76 inputs and sufficient time for RAM address generation, the NA field of the addressed firmware word is clocked into the WCS Jump Address register (JADD) 78 at the beginning of each firmware cycle (SYSCLK) as shown in FIG. 3. Similarly, the BR bits (1, 2, 3) of the firmware word, which control SELA MUX 74 selection, are stored in WCS flip-flops 160 and 162 with the same timing signal (SYSCLK). Since this timing signal is derived directly from the CPU master clock (MCLOCK), the CPU next address generation logic and the WCS RAM address logic are always synchronized.

The Select Address MUX (SELA) 74 selects the WCS RAM memory access address in all cases except when a branch to the NA field of a firmware word is required. However, if a branch to the NA field is required, the DADD MUX 76 overrides the SELA MUX 74 selected address by delivering the Jump Address register 78 (NA field) to the RAM memories.

The output of the SELA MUX 74 is determined by the binary code on MUX control functions MUXSL4, MUXSL2, MUXSL1 at the outputs of respectively inverter 164, and OR gates 166 and 168. The input to inverter 164 is coupled from the output of OR gate 170, which output also enables the coupling flip-flops 160 and 162 to OR gates 168 and 166 by AND gates 172 and 174 respectively. OR gates 170 is coupled to receive the commands noted from decoder 34. This select code is generated according to the type of operation the WCS is performing. For select code generation purposes, WCS operations can either be a firmware controlled operation or a force RAM address operation. In a firmware controlled operation, the select code is generated directly from the BR field of the firmware word and is valid for one firmware cycle. In a force RAM address operation, the BR field is ignored and the select code is forced according to specific WCS commands or mode of operation stored in the WCS. The select code generated by a force RAM address operation causes the firmware cycle to remain valid as long as the forcing condition is present. Any select code generated by a force RAM address operation has priority over a firmware controlled generated select code.

Any of the conditions listed below indicates a force RAM address operation is in effect. Each condition generates a unique select code and therefore causes a specific input address to be selected by the SELA MUX 74. The force RAM address conditions are:
 a WCS read or write RAM command is being executed in the WCS (this condition is in effect when R/W timing one-shot BUSKIL/BSCNCK is active);
 an Entry command is being executed by the WCS (command decode function (SPCONT) indicates this condition); and the WCS is in transparent mode, TRANSP is true.

A firmware controlled select code is generated if no force RAM address condition exists. This can only occur if the WCS is in sequential mode, and when in this mode, the address selected by the SELA MUX 74 can only come from three sources: the increment counter (MCNT) 70, the return from subroutine register (RSBA) 72, and from a register included in the CPU 12, the so-called CPU link register (the CPU link register output is forced on NAG lines 94 when CPU logic decodes a link type branch in the BR field of the firmware word). Since only three sources can be selected, only two bits of the BR field (MEMD50 and MEMD49) are necessary to generate the select code.

Figure 22:
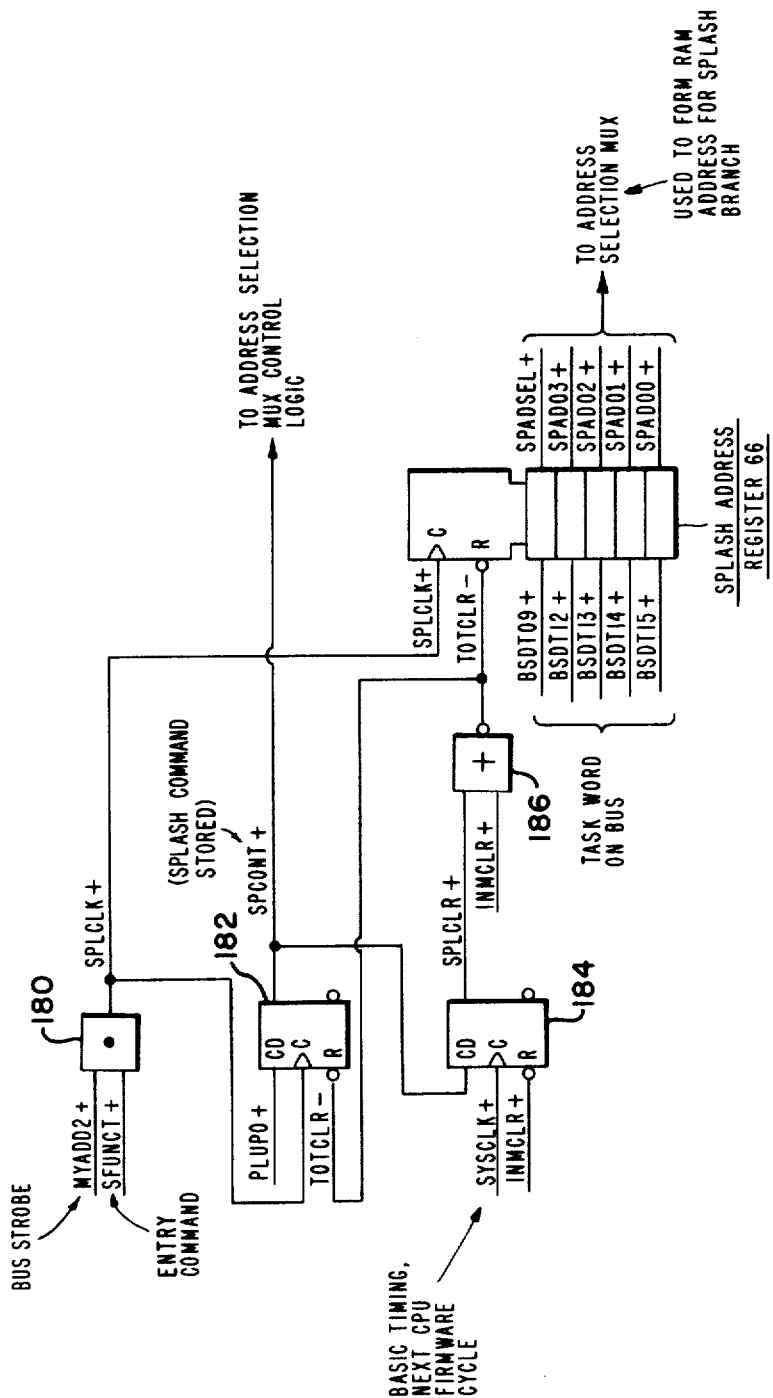
FIG. 22 is a logic diagram illustrating the so-called splash address register used in conjunction with the storage device of the present invention.

The Splash Address register, as shown in detail in FIG. 22, provides temporary storage for the task word supplied on the bus 14 data lines when an Entry command is issued to the WCS. This word is used to form the RAM address for the entry firmware cycle. It is necessary to store the task word since bus data is not valid the entire firmware cycle. At the beginning of the next firmware cycle (SYSCLR), the contents of the splash register is cleared to all zeros. The following describes the operation of this register. When an Entry command is issued to the WCS, function Splash Clock (SPLCLK) at the output of AND gate 180 is pulsed true at the bus 14 strobe time (MYADD2). SPLCLK pulsing causes two things to happen: (1) the Splash Command Stored (SPCONT) flip-flop 182 is set. This flip forces a select code on the SELA MUX 74 control lines. Thus, the splash register input is selected to address RAM; and (2) the task word on bus lines BSDT09, BSDT12 through BSDT15 is strobed into splash register 66 bits SADSEL, SPAD03 through SPAD00 respectively. This output is connected to the SELA MUX 65 where it forms the RAM address. This address is forced to access RAM because SPCONT is set. At the beginning of the next firmware cycle, (i.e., timing signal SYSCLK transition to true), flip-flop Splash Clear (SPLCLR) 184 is set. This causes SPCONT to clear via OR gate 186 which allows a new SELA select code to be generated, and the contents of the splash register to clear to all zeros. SPLCLR clears during the following firmware cycle.

Figure 23:
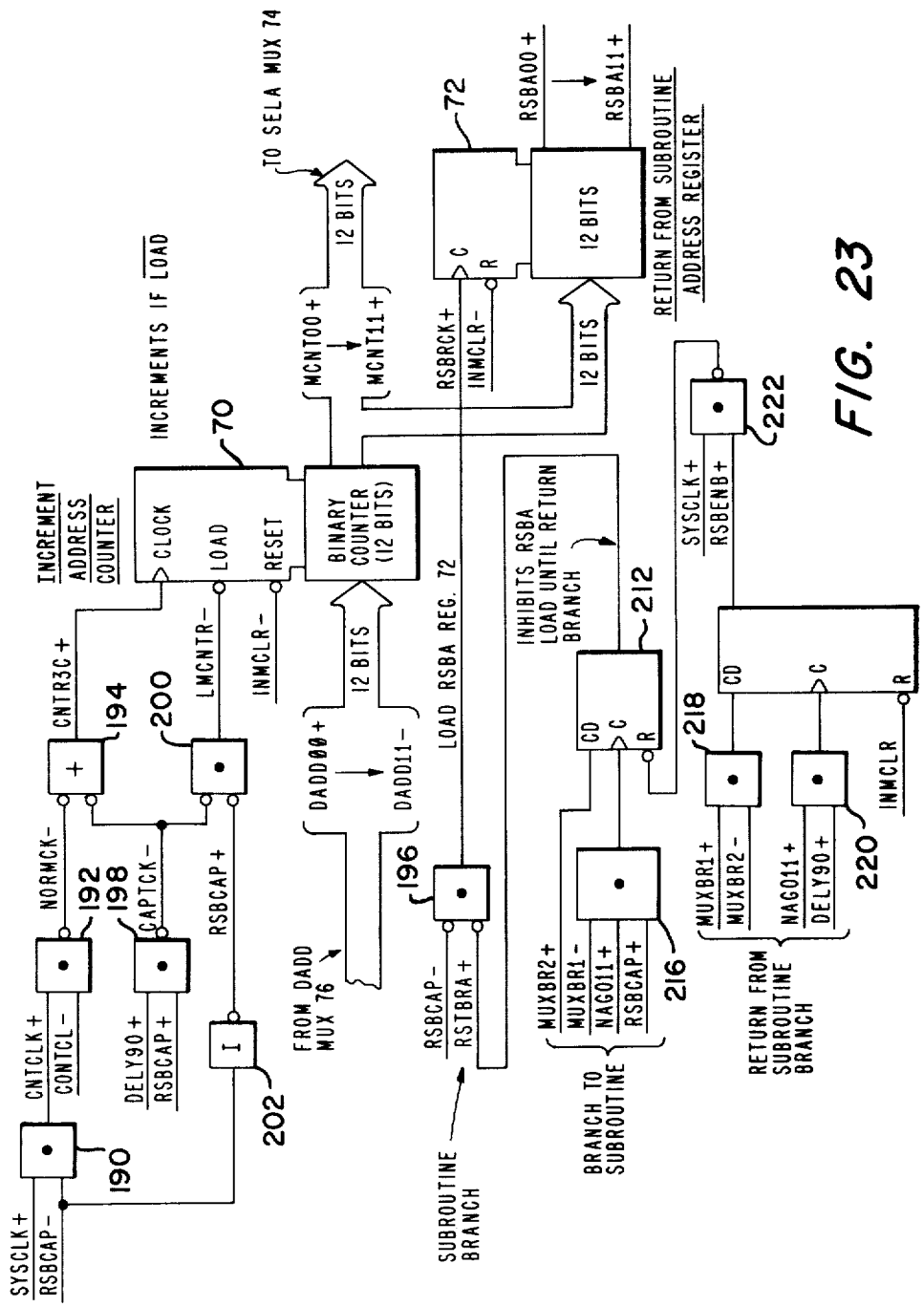
FIG. 23 illustrates the detailed logic of the increment address counter and the return from subroutine register utilized in conjunction with the storage device of the present invention.

As shown in detail in FIG. 23, the Increment Address Counter (MCNT) 70 is a 12-bit up-counter which supplies an incremented RAM address each firmware cycle. This counter is synchronous, such that it requires a clock pulse (CNTR3C) for it to be either incremented or loaded. The following describes the operation of MCNT counter 70. At the beginning of each firmware cycle (SYSCLK), the contents of the MCNT counter 70 are incremented by clock pulse CNTR3C by means of OR gates 190 and 192 and AND gate 194. This incremented output (MCNT00-11) is sent to the Select Address MUX (SELA) 74. The MCNT 70 address can be selected as the RAM address if the proper select code is generated. The incremented address is also sent to return from subroutine register (RSBA) 72. It is strobed into register 72 by use of the RSBCAP signal and AND gate 196 60 nsec after the increment into RSBA register, if firmware is not already in a subroutine. The delay insures that the MCNT counter 70 is stable before storing a subroutine return address. A period of 90 nanoseconds after the beginning of each firmware cycle, the RAM addressing logic is stable and the RAM address is valid at the output of the DADD MUX 76. At this time, load pulse LMCNTR is generated via AND gates 198 and 200 as well as inverter 202 to cause the new RAM address to be loaded into the increment counter (MCNT) 70. This address can be either the incremented address in MCNT 70 or RSBA 72 or any other address selected by the RAM address MUXs SELA 74 and DADD 76. The MCNT counter 70 can asynchronously be cleared by initialize signal INMCLR.

The Return From Subroutine Register (RSBA) 72 stores the return address for the WCS when a branch to a firmware subroutine is executed. FIG. 23 also illustrates the detailed RSBA logic. The output of this register (RSBA) 72 is then selected to address RAM when a return from subroutine micro-instruction is executed. The incremented address from MCNT 70 is loaded into this register 72 each firmware cycle except when executing subroutine firmware. This is accomplished by inhibiting the RSBA register 72 load function (RSBRCK) during subroutine execution. Thus, when a return from subroutine micro-instruction is executed, the next sequential location after the location containing the branch to the subroutine is entered. The RSBA register is loaded 60 nanoseconds (RSBCAP) after the beginning of each non-subroutine firmware cycle by use of AND gate 196. The delay insures the MCNT counter 70 is stable before storing the return address. Flip-flop RSTBRA 212 prevents the changing of RSBA 72 contents during subroutine operations. When a branch to a subroutine micro-instruction is detected ($\overline{\text{MUX-BR1}}$·MUXBR2·NAG11) at the inputs of AND gate 216, flop RSTBRA 212 sets, inhibiting loading function RSBRCK. When a return to subroutine branch is detected (MUXBR1·$\overline{\text{MUXBR2}}$·NAG11) at the inputs of AND gates 218 and 220, RSTBRA (flip-flop 212) will clear via AND gate 222 at the beginning of the next firmware cycle (SYSCLK) and allow a new address to be stored in RSBA.

The system bus 14 is the interface used by the CPU and other units to communicate between each other. All WCS commands issued by the CPU are transmitted to the WCS over this bus, while the WCS only transfers data to the CPU via this bus. The WCS does not communicate directly with main memory. All operations on the bus 14 are asynchronous and communications are on a master/slave relationship. The master unit requests a bus cycle and transfers the slave channel number and data information to the slave unit. In return, th slave unit recognizes its channel number and responds with the appropriate response signal. The response signal terminates the bus cycle. If no response signal is issued, a time-out terminates the bus cycle.

It requires two bus cycles to read information from the WCS. In the first cycle, the CPU is the master and issues the read command to the WCS to request the data. In the second bus cycle, the WCS becomes the master and transmits the requested data to the CPU. The three commands to the WCS that generate two bus cycle operations (1) input status command, (2) input ID command, and (3) Read RAM Command. Only one bus cycle is required to issue a write or any other command to the WCS. In this case, the CPU is always the master and all required information is transferred to the WCS in one bus cycle. A complete description of the bus 14 may be found in U.S. Pat. No. 3,993,981, issued Nov. 23, 1976. Bus control signals described in such patent are described here for convenience of the reader.

There are seven major bus signals that control the bus operations. A description of these signals in relation to the WCS is provided below. Each signal is true when its bus line is driven to ground.

BSREQT—(Bus Request)—When this signal is true it indicates some master unit is requesting a bus cycle. This signal is only driven true by the WCS when requesting a second half bus cycle.

BSDCNN—(Data Cycle Now)—This signal when true indicates that a master unit has placed information on the bus for use by a specific slave unit. If the WCS is not the master, it must now determine if it is the addressed slave unit and determine the response to the master. The three possible responses are: (1) BSACKR, (2) BSWAIT and (3) BSNAKR. During a second half read bus cycle, the WCS is the master and drives BSDCNN true when transmitting valid data to the CPU. These responses are described as follows:

BSACKR—(Acknowledge Response)—The WCS drives this signal true to inform the CPU (master) that it is accepting the present bus transfer.

BSWAIT—(Wait Response)—The WCS drives this signal true to inform the master that the WCS requires more time to complete the command. This causes the master to reissue the bus cycle. The WCS generates BSWAIT responses for the following commands: (1) Entry, (2) Exit RAM, Return to PROM Control, and (3) Read or Write RAM.

BSNAKR—(Negative Response)—The WCS drives this signal true to inform the master it has detected an error and is not accepting the bus transfer. The following WCS conditions will generate a NAK response: (1) Megabus parity error, (2) RAM loading error detected, and (3) Non-existent Resource addressed. The WCS never expects to receive a BSNAKR in response to a second half read cycle. If a BSNAKR is received, the WCS will now request another second half read cycle and the CPU will never receive the data.

BSMREF—(Memory Reference)—This signal, when true, indicates that this is a memory reference cycle. The WCS drives this signal false during a second half read cycle.

BSSHBC—(Second Half Bus Cycle)—This signal indicates that this is a second half read cycle. The WCS drives this signal true when transmitting data to the CPU.

When the CPU issues a WCS command, the WCS must respond with one of the three response signals: (1) BSWAIT (Stall CPU—reissue command), (2) BSACKR (Normal Acknowledge-command accepted), or (3) BSNAKR (Negative Response-command not accepted).

The BSWAIT signal is used to stall the CPU to allow time for accessing RAM or switching between PROM and RAM firmware control. As mentioned before, different stall times are required for different commands. The number of BSWAIT responses generated create the necessary delay.

Figure 24:
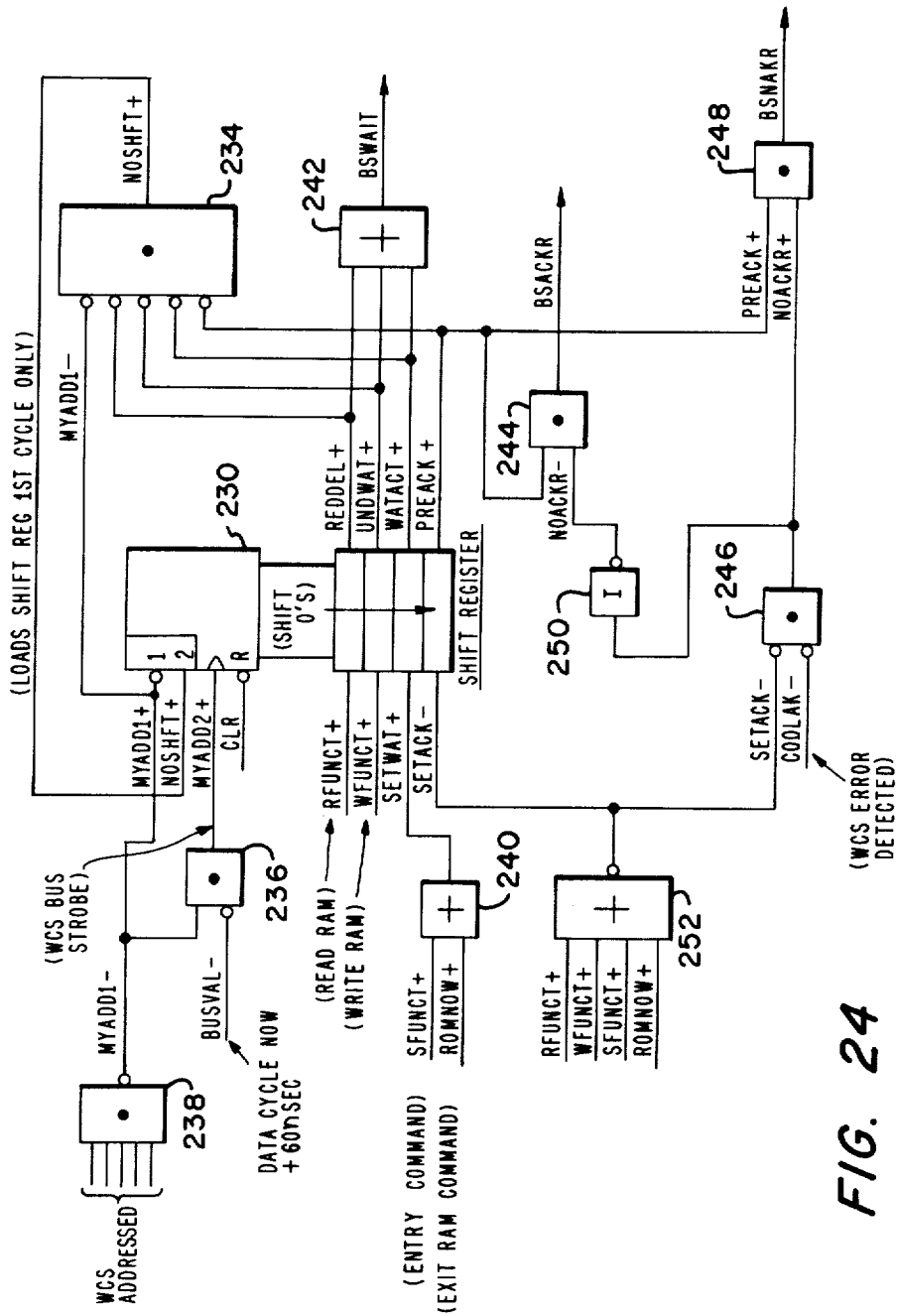
FIG. 24 is a detailed logic diagram of the bus response logic included in the bus control logic utilized in conjunction with the storage device of the present invention.

A shift register 230 as shown in FIG. 24 is used to generate the correct number of responses. All commands issued to the WCS set some bit in the shift register when the WCS bus strobe (MYADD2) is generated via AND gates 236 and 238. The commands are received at the respective inputs of shift register 230 depending on the number of wait stalls required as discussed hereinbefore. Two such commands which require the same number of stalls are received at the same input of shift register 230 via OR gate 240. If the last stage of the shift register (PREACK) is not set, a BSWAIT response is generated via OR gate 242. This causes the bus cycle to terminate and a subsequent new bus cycle to be generated. Each reissued bus cycle generates a new MYADD1 and since some bit was previously set in the shift register a shift pulse (NOSHFT) is generated via AND gate 234. This causes the stored bit to shift towards the last stage (PREACK) of the shift register 230. If PREACK is not set, a BSWAIT response is again issued causing a new bus cycle and another shift. When PREACK does set, a BSACKR response is generated via AND gate 244. This terminates the bus operations and informs the CPU that the WCS has accepted the command.

If an error bit is stored (COOLAK) in the WCS status register, when PREACK becomes true, a negative response (BSNAKR) is issued, via AND gates 246 and 248 with AND gate 244 inhibited by means of gate 246 and inverter 250. A Read Status, Read I.D., Load Address, or Initialize are never NAKed by the WCS. The negative response terminates the bus operation and informs the CPU that the WCS did not accept the command. The WCS status register 88 can be interrogated to determine the nature of the error.

Figure 25:
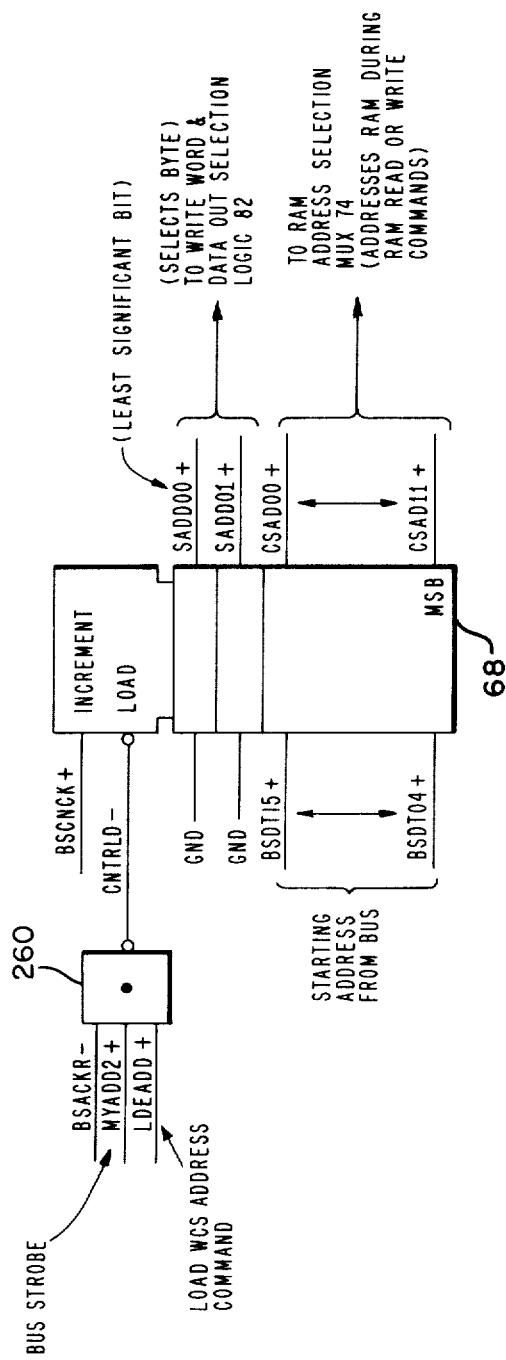
FIG. 25 illustrates the detailed logic for the bus address counter used in conjunction with the storage device of the present invention.

The bus address counter 68 is a 14 bit up-counter as shown in FIGS. 3 and 25. This counter stores the RAM address used to access RAM when either a write or read RAM command is executed. It is initially loaded by a separate WCS command (LDEADD) received at one input of AND gate 260 and then incremented by means of the BSCNCK signal (see FIG. 19) each time a read or write RAM command is executed. Since the firmware word stored in one RAM location is 64 bits wide and the system bus data lines can only handle one (16 bit) data word, the least significant bits of this counter (SADD01, SADD00) are used as data word pointer bits. The binary configuration of these bits points to the data word within a firmware word which is to be manipulated. When writing in the RAM, these bits determine which write word pulse is generated for each command. When reading RAM, these bits control the output of the output data selector MUX 82 and therefore select the word to be transferred to the CPU. When an initial address is loaded into this counter 68, these pointer bits are loaded to zeros. This insures that these pointer bits will always be pointing to the first data word (word 0) when the first read or write command is issued after the address load command is executed. The actual address used to access RAM is stored in the upper 12 bits of this register (CSAD00-CSAD11).

The bus address counter is incremented after each read or write RAM command is executed. Two hundred and seventy nanoseconds after a read or write command is stored, one-shot 128 (BSCNCK+) (see FIG. 19) will clock true indicating the data word was either read from or written into the RAM. This transition causes the bus address counter to increment, causing the pointer bits to point to the next firmware word. Thus, when the next read or write command is issued, the next data word is manipulated. Four reads or writes respectively read or store a complete firmware word. When this occurs the counter automatically increments the counter bits to access RAM at the next sequential RAM location. No new load RAM address command is required.

As discussed hereinbefore, the WCS can generate a firmware address in one of the two modes of operation: (1) Normal Transparent Mode, (2) Sequential Mode. A manual switch 95 is located in the WCS is used to select the WCS mode of operation. When in sequential mode, 3 bits (63, 50, 49) of the firmware word are interpreted by the WCS to determine the source of the next firmware address. In this sequential mode, the WCS logic drives these bits (CSNA11, CSBR01, CSBR02) false as they are delivered to the CPU via the private WCS/CPU interface 16. When in transparent mode, these three bits are read from RAM and delivered unaltered to a register in the CPU 12. In this mode of operation, normal CPU NAG logic generates the next firmware address. Transparent mode flip-flop (TRANSP) 270 insures the CPU NAG output is selected to address the WCS RAM. The transparent/sequential mode (TP) switch 95 is shown in detail in FIG. 26. This switch may be a hex rotary switch. However, only two switch positions are valid (O and F). When in position F, the sequential mode is selected and when in position O, the transparent mode is selected. When the TP switch selects transparent mode (position O), function STAB09- is connected to ground causing the WCS transparent mode status bit (STAB09) at the output of inverter 272 to be true and sequential mode status bit (STAB04) at the output of inverter 274 to be false. In this position, the switch 95 routes the output of RAM memories (MEMD63, MEMD50, MEMD49) directly to the local register of the CPU PROM as bits CSNA11, CSBR02, CSBR01.

Figure 26:
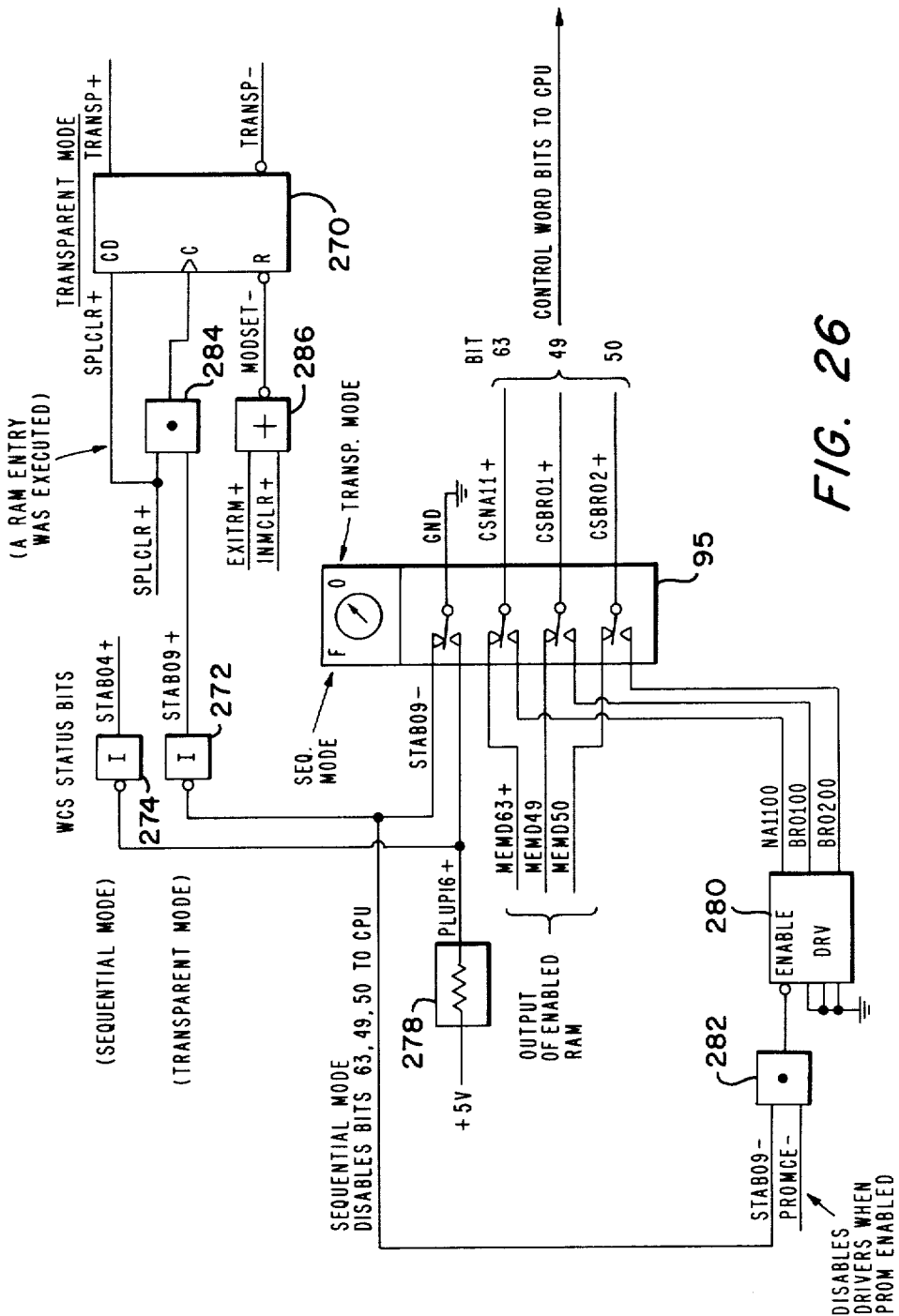
FIG. 26 illustrates the details of the transparent mode/sequence mode switch used in conjunction with the storage device of the present invention.

When the TP switch selects sequential mode (position F), the open contacts shown in FIG. 26 are made. This causes PLUP16+ on one end of resistor element 278 to be grounded, thus the sequential mode status bit (STAB04) is driven true and transparent mode status bit (STAB09) is driven false. When STAB09 is false, it enables drivers (NA1100, BRO200, BRO100, 280 via AND gate 282. These drivers 280 are always driven false and are selected by the TP switch 95 as the firmware bits 63, 50, 49 delivered to the CPU for sequential mode. If the CPU PROM is enabled (PROMCE), these drivers are disabled to allow the normal output of the CPU control store to be loaded in the CPU's local register. The transparent mode flip-flop (TRANSP) 270, which controls WCS RAM addressing, is not directly set by the transparent mode switch. It is clocked (SPLCLR) via AND gate 284 to the state of the TP switch only after an Entry command has been executed. This allows the WCS to execute an entry to the user's firmware and then, the very next clock cycle (SPLCLR), the user's firmware is executed in the mode selected by the TP switch 95. The TRANSP flip-flop 270 is cleared to sequential mode via OR gate 286 if a Return to PROM command is decoded (EXITRM) or an initialize signal (INMCLR) is sensed. If the flip-flop 270 clears, it requires another Entry command to set TRANSP 270 again.

Figure 27:
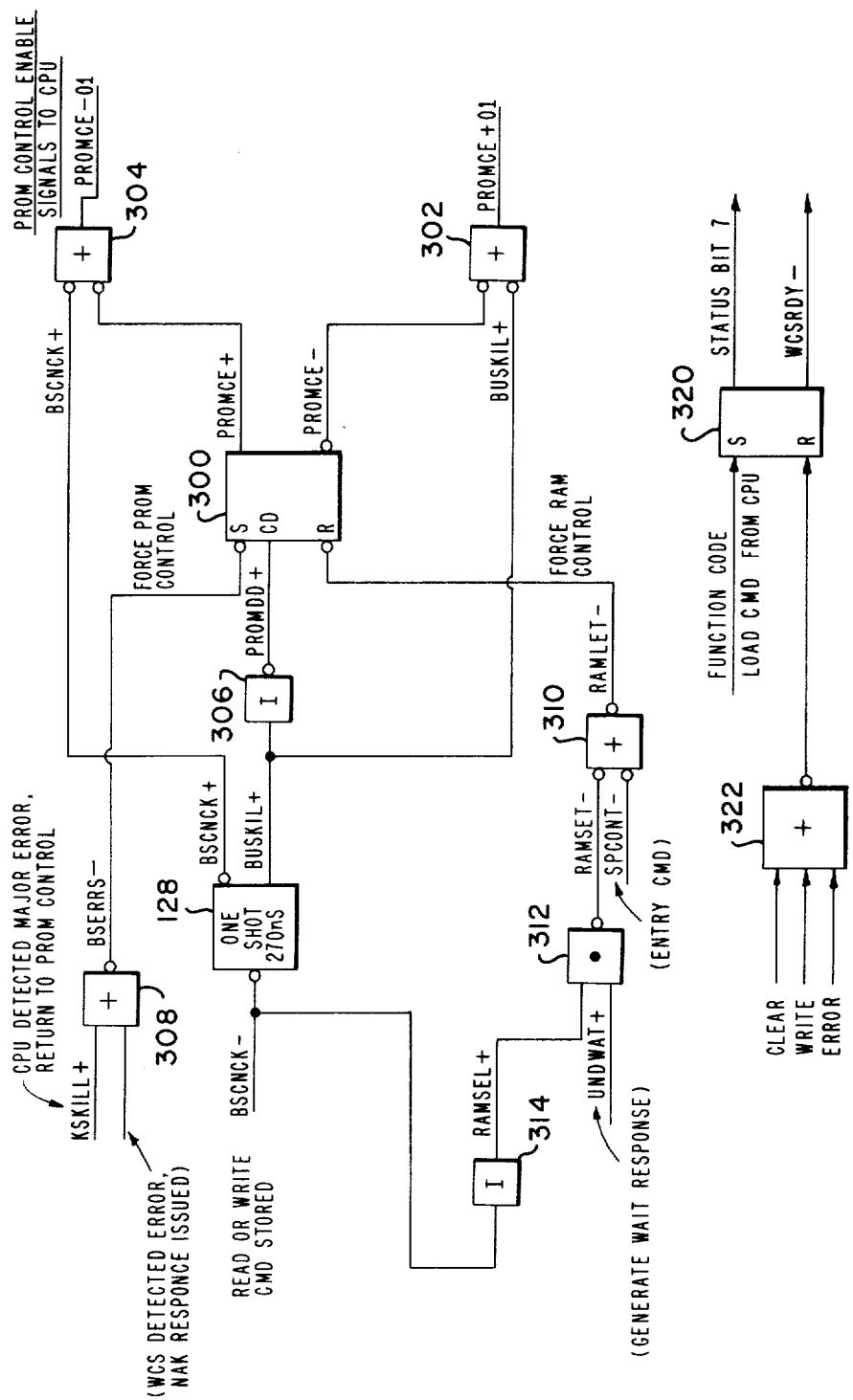
FIG. 27 illustrates the details of the PROM/RAM control logic used in conjunction with the storage device of the present invention.

The output of the CPU firmware PROM memory and the output of the WCS RAM memory are physically connected together at the output of the CPU control store. Therefore, only one of these memories must be enabled at any one time. As shown in FIG. 27, flip-flop PROM Control Enable (PROMCE) 300 located in the WCS determines which memory is enabled. If PROMCE 300 is set, the CPU PROM memory is enabled. The CPU PROM enabling signal (PROMCE-01) is transmitted to the CPU 12 via OR gate 304. This signal is derived directly from the PROMCE flop 300, ORed with R/W RAM timing one-shot BSCNCK 128 (FIG. 19). This gating insures that the CPU PROMs are disabled during the time the actual read or write RAM occurs. When the one-shot 128 relaxes (BUSKIL), PROMCE flip-flop 300 is clocked to the RAM enable state by function PROMDD via inverter 306. However, if a force PROM control (BSERRS) condition exists, as indicated at the output of OR gate 308, PROMCE 300 will set and the CPU firmware will remain in control. The following conditions will force PROMCE 300 to set thereby enabling the CPU PROM: (1) If the CPU detects a major error (e.g., fatal memory error, etc.), it forces all CPU NAG lines to zeros. If the WCS is in sequential mode (TRANSP−) and detects the all-zero NAG condition, it drives PROM enable signal KSKILL true. (2) If the WCS generates a NAK response, the PROM enable is forced. A NAK response can only be generated if a WCS error status bit is set. (3) If an exit RAM control command is decoded (EXITRM), the PROM enabled is forced. (4) If an Initialize signal is sensed (INMCLR), PROMCE is set to enable CPU PROM control.

There are two conditions that force PROMCE to clear in response to the RAMLET signal at the output of OR gate 310 thus enabling WCS RAM control, (1) When an Entry command (SPCONT) is stored in the WCS and (2) when the WCS generates a wait response (UNDWAT) at the input of AND gate 312 during the execution of a READ or Write RAM command (RAMSEL) received at the output of inverter 314.

Flip-flop 320 is used during the initialization of the storage device of the present invention. The clear input is coupled via OR gate 322 to clear, write, and error condition input signals, any of which causes a lockout condition. When any one of these lockout conditions is active, then there is a return to PROM operation. When flip-flop 320 is cleared the WCSRDY signal will no longer indicate an active condition to the CPU, in which event an Entry command will not be accepted until such lockout condition(s) are cleared. The set input of flip-flop 320 is coupled to receive a function code which is basically a load command received via the bus 14. If there is an incorrect or unsuccessful load, then the clear action on flip-flop 320 will override the setting function and there will be an indication (WCSRDY-) back to the CPU that the WCS is not ready. Furthermore, for the later use of the CPU, the state of a status bit (number 7) is altered in the status logic 88, thereby allowing such status to be visible to the CPU. Such status bit can indicate at a later time that the WCS is not ready, if, in fact, an error condition has resulted, even though, in fact, the system initially indicated that the WCS was ready. An Entry command is not issued to the WCS if the WCSRDY flip-flop 320 is cleared. This flip-flop 320 is cleared when the WCS RAM is written, an initialize (clear) signal is sensed, an error condition is sensed or if a NAK response is received by the WCS. The WCSRDY flip-flop 320 is only set by issuance of an appropriate output command from the CPU to the WCS. In this way, the CPU can insure that the user's firmware in the WCS is only executed with permission of the CPU, i.e., a lockout condition exists otherwise.

Figure 28:
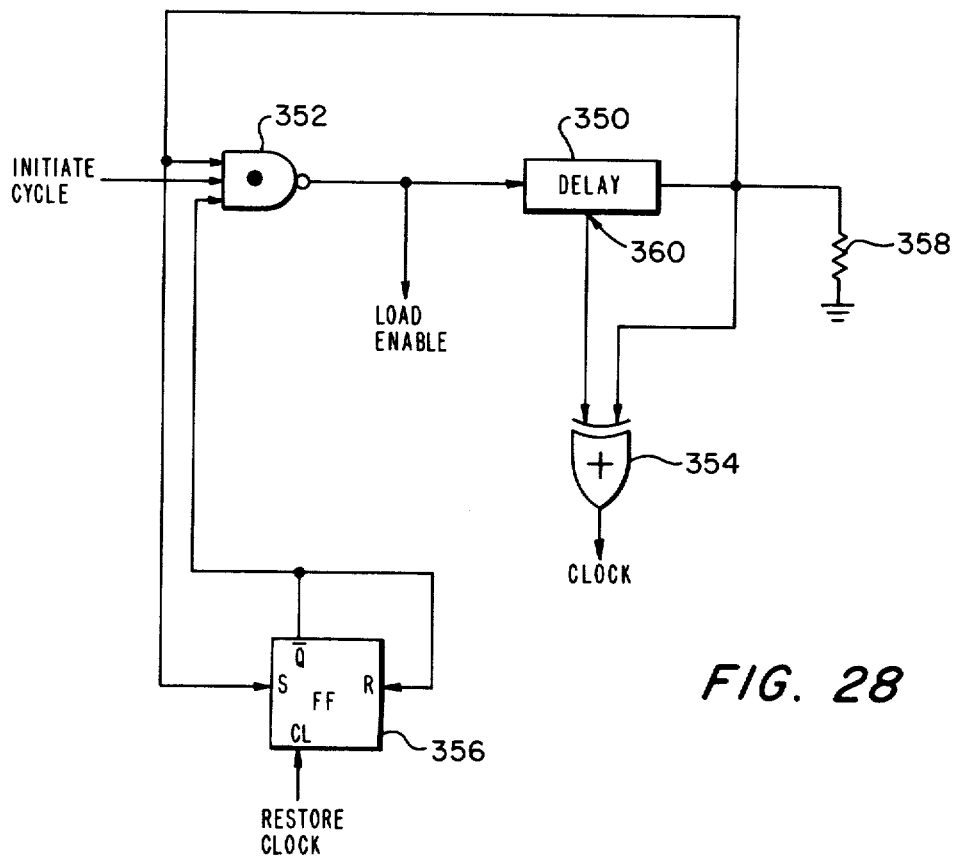
FIG. 28 illustrates details of an alternative embodiment of a portion of the logic shown in FIG. 23.

The logic of FIG. 23 illustrated the manner in which increment address counter 70 was loaded and clocked. Logic elements 190, 192, 194, 198, 200 and 202 described the manner in which such loading and clocking operation was accomplished. FIG. 28 illustrates an alternative embodiment for such logic elements. The logic of FIG. 28 is especially useful because of its extremely fast operation. For example, when an address is received at the output of direct address multiplexer 76 and, accordingly, at the input of counter 70, as well as the address input of WCS firmware storage 24, such address must be loaded and then incremented in counter 70 within the same cycle. To compound the problem, a period of time must pass during the cycle to insure that the address at the output of multiplexer 76 is stable and, accordingly, error free. Since storage 24 does not need the time needed by counter 70 to perform their respective operations, this timing problem does not present any dilemma to the storage 24. Thus, the counter 70 must wait for a portion of the cycle to insure that the address is stable following which it must, before the start of the next cycle, load such address and then increment such address, which incrementing must be accomplished well before the beginning of the next cycle.

Referring to the logic of FIG. 28, this fast operation of loading and then incrementing is accomplished by use of a delay 350 such as a delay line with a single tap 360 coupled about half-way down the delay 350 and with the output of the delay line coupled as twin inputs to an exclusive-OR gate 354 to produce a clock pulse. A load enable signal is generated by use of a NAND gate 352 coupled to receive three inputs, one from the output of the delay 350, and another, the initiate cycle signal, which is received near the end of the cycle indicating the impending start of the next cycle. The third input is received from the $\overline{Q}$ output of the flip-flop 356 which is used to ensure that only one cycle of the logic of FIG. 28 is produced in response to the initiate cycle signal.

In operation, following receipt of the initiate cycle signal (a binary 1), and since the other two inputs to gate 352 are initially binary 1's, the load enable signal goes to a binary 0. This change in state from a binary 1 to a binary 0 is propagated down the delay 350. When a binary 0 is received at tap 360, the clock signal at the output of gate 354 goes to a binary 1, following which, when the binary 0 is received at the output of the delay 350, the output of gate 354 goes to a binary 0 thus completing the generation of the clock signal. Feedback from the output of delay 350 to gate 352 of the binary 0 then causes the output of gate 352 to go to a binary 1, thereby terminating the load enable signal and causing a binary 1 to be propagated down delay 350. One more clock signal is generated when the binary 1 is received at tap 360. Such second signal is terminated when the binary 1 signal continues down the line 350, and reaches the end of line 350.

Thus, the load enable signal is generated prior to and during the generation of the first clock signal, and the simultaneous presence of such signals clocks the address into the counter 70. When the second clock signal is received, and with the load enable signal no longer present, the counter is incremented.

Flip-flop 356 is used to insure that only one such operation or cycle of operation of the logic of FIG. 28 is generated. The restore clock signal, received just before the initiate cycle signal, is used to clear flip-flop 356. Initially therefore, the $\overline{Q}$ output is a binary 1. When a binary 0 is received at the set input, flip-flop 356 will be set and the $\overline{Q}$ output will change to a binary 0 thereby maintaining a binary 1 at the output of gate 352 and disabling any further binary state transitions until such time as the restore clock signal followed by the initiate cycle signal are again received.

Having described the invention, what is claimed as new and novel and for which it is desired to secure Letters Patent is:

1. A microprogram-controlled data processing system wherein a set of system control words is augmented by an externally-supplied set of user-generated control words, said system comprising:

a control store having a first control memory means for storing said set of user-generated control words;

a central processor unit having a second control memory means for storing said set of system control words, said central processor unit constructed and arranged to execute either a system control word or a user-generated control word under the control of said microprogram, said central processor unit further generating (1) addresses for addressing said first control memory means, (2) instructions for controlling said control store, and (3) data for storing in said first control memory means;

a bus for coupling said central processor unit to said control store and for transferring between said control store and said central processor unit said generated addresses, instructions, and data;

means in said control store for receiving said transferred addresses, instructions and data, and for addressing said first control memory means in response to said received addresses;

means in said control store for transferring an addressed user-generated control word from said first control memory means to said central processor unit over said bus;

means for interfacing said central processor unit with said control store, said interfacing means having address coupling means for transferring a central processor unit generated address designating a location in said first control memory means to said control store, and control word coupling means for transferring independently of said bus an addressed one of said user-generated control words from said first control memory means to said central processor unit;

means coupled to said bus for loading said externally-supplied set of user-generated control words into said first control memory means under the control of said central processor unit; and means, coupled to said first control memory means, for verifying that said user-generated control words loaded in said first control memory means by said loading means have been correctly loaded.

2. A system as in claim 1 further comprising:
A. a plurality of data processing devices;
B. means for coupling said devices to said bus for the transfer of information therebetween and between said devices and said central processing unit and said control store; and
C. wherein said interfacing means is used exclusively by said unit and said control store.

3. A system as in claim 1 wherein said central processor unit further generates a read instruction for controlling said receiving means to address said user-generated control word stored at a said generated address in said first control memory means and for controlling said transferring means to transfer said addressed user-generated control word to said central processor unit over said bus.

4. A system as in claim 3 wherein said bus is not capable of simultaneously transferring an entire control word and wherein said system further comprises means, responsive to a portion of said generated address received from said unit, for sequentially transferring portions of the addressed one of said control words until all of said addressed one of said control words is transferred to said unit.

5. A system as in claim 1 wherein said second control memory means stores control words which are generally useful to all users of said central processing unit and wherein said user-generated control words stored in said first control memory means are useful to only one or a limited class of users.

6. A system as in claim 5 wherein the contents of said first control memory means are alterable by said user.

7. A system as in claim 1 further comprising
means for coupling said address coupling means and said means for receiving and addressing.

8. A microprogram-controlled data processing system wherein a set of system control words is augmented by an externally-supplied set of user-generated control words, said system comprising:
a control store having a first control memory means for storing said user-generated set of control words;
a central processor unit having a second control memory means for storing said set of system control words, said central processor unit constructed and arranged to execute either system control words or said microprogram, said central processor unit further generating (1) addresses for addressing said first control memory means, (2) instructions for controlling said control store, (3) data for storing in said first control memory means, and (4) select signals;
a bus for coupling said central processor unit to said control store and for transferring between said control store and said central processor unit said generated addresses, instructions, data and select signals;
means in said control store for receiving said transferred addresses, instructions, data and said select signals, and for addressing said first control memory means in response to said received addresses;
means in said control store for transferring an addressed user-generated control word from said first control memory means to said central processor unit over said bus;
means for interfacing said central processor unit with said control store, said interfacing means having address coupling means for transferring a central processor unit generated address in said first control memory means to said control store, and control word coupling means for transferring independently of said bus an addressed one of said user-generated control words from said first control memory means to said central processor unit;
means for coupling said control word coupling means and said addressing means;
a plurality of sources, including said addressing means and said receiving means, for addressing said second control memory means;
means in said control store for receiving a said select signal; and
means in said control store in response to a said received select signal for selecting one of said sources for addressing said first control memory means.

9. A system as in claim 8 wherein said means for selecting includes multiplexer apparatus.

10. A system as in claim 8 wherein said select signal is included in said address transferred by said address coupling means.

11. A system as in claim 8 wherein said plurality of sources includes:
A. a first register coupled to receive a predetermined portion of an addressed one of said control words from said first control memory means; and
B. a second register coupled to provide an address of a one of said control words in said first control memory means which has an address sequentially following the address of the then addressed one of said control words in said first control memory means.

12. A system as in claim 11 wherein said select signal has a first level or a second level; and wherein said system further comprises means for enabling said means for addressing to address said first control memory means with the contents of said first register in response to said first level of said select signal; and wherein said system further comprises means for enabling said means for addressing to address said first control memory means with the contents of said second register in response to said second level.

13. A system as in claim 12 wherein said select signal is generated by said unit in response to one or more tests conducted by said unit.

14. A microprogram-controlled data processing system wherein a set of system control words is augmented by an externally-supplied set of user-generated control words, said system comprising:
a central processor unit having a second control memory means for storing said set of system control words, said central processor unit constructed and arranged to execute either a system control word or a user-generated control word under the control of said microprogram, said central processor unit further generating (1) addresses for addressing said first control memory means, (2) instructions for controlling said control store, and (3) data for storing in said first control memory means;

a bus for coupling said central processor unit to said control store and for transferring between said control store and said central processor unit said generated addresses, instructions, and data;

means in said control store for receiving said transferred addresses, instructions and data, and for addressing said first control memory means in response to said received addresses;

means in said control store for transferring an addressed user-generated control word from said first control memory means to said central processor unit over said bus;

means for interfacing said central processor unit with said control store, said interfacing means having address coupling means for transferring a central processor unit generated address designating a location in said control memory means to said control store, and control word coupling means for transferring independently of said bus an addressed one of said user-generated control words from said first control memory means to said central processor unit;

means in said central processor unit and responsive to a generated instruction, for transferring control of said central processor unit from said system control words stored in said second control memory means to said user-generated control words stored in said first control memory means;

means in said control store, for generating a transfer signal indicating that said user-generated control words stored in first control memory means have completed control of the operation of said central processor unit; and means, in said control store and responsive to said generated transfer signal, for transferring control of said central processor unit from said user-generated control words stored in said first control memory means to said system control words stored in said second control memory means.

15. A microprogram-controlled data processing system wherein a set of system control words is augmented by an externally-supplied set of user-generated control words, said system comprising:

a control store having a first control memory means for storing said set of user-generated control words;

a central processor unit having a second control memory means for storing said set of system control words, said central processor unit constructed and arranged to execute either a system control word or a user-generated control word under the control of said microprogram, said central processor unit further generating (1) addresses for said first control memory means, (2) instructions for controlling said control store, and (3) data for storing in said first control memory means;

a bus for coupling said central processor unit to said control store and for transferring between said control store and said central processor unit said generated addresses, instructions, and data;

means in said control store for receiving said transferred addresses, instructions and data, and for addressing said first control memory means in response to said received addresses;

register means in said control store and having a plurality of positions, including a last position for storing indicia, each of said positions having an input, and wherein said register means includes means for shifting an indicia stored in one of said positions toward said last position;

means, in said control store, responsive to an instruction received from said central procesor unit, for storing a said indicia in a said position in said register means;

means, in said control store, for executing an operation indicated by said instruction if said indicia is stored in said last position;

means, in said control store, for activating said shifting means if said indicia is not stored in said last position;

means, in said control store, for indicating to said unit that a request to execute a said generated instruction should be made by said control store if said indicia is not stored in said last position;

means, in said control store, responsive to a repeated request from said central processor unit to execute a said generated instruction, for enabling said activating means or said executing means depending upon the location of said indicia in said register means;

means in said control store for transferring an addressed user-generated control word from said first control memory means to said central processor unit over said bus; and means for interfacing said central processor unit with said control store, said interfacing means having address coupling means for transferring a central processor unit generated address in said first control memory means to said control store, and control word coupling means for transferring independently of said bus an addressed one of said user-generated control words from said first control memory means to said central processor unit.

16. A system as in claim 15 wherein said means for activating and said means for indicating are used to provide said control store with sufficient time to complete other operations and to prepare to execute a said generated instruction.

17. A microprogram-controlled data processing system wherein a set of system control words is augmented by an externally-supplied set of user-generated control words, said system comprising:

a control store having a first control memory means for storing said set of user-generated control words;

a central processor unit having a second control memory means for storing said set of system control words, said central processor unit constructed and arranged to execute either a system control word or a user-generated control word under the control of said microprogram, said central processor unit further generating (1) addresses for addressing said first control memory means, (2) instructions including write signals for controlling said control store, and (3) data for storing in said first control memory means;

a bus for coupling said central processor unit to said control store and for transferring to said control store said generated addresses, instructions, and data;

means in said control store for receiving said transferred addresses, instructions and data, and for addressing said first control memory means in response to said received addresses;

means in said control store for transferring an addressed user-generated control word from said first control memory means to said central processor unit over said bus;

means for interfacing said central processor unit with said control store, said interfacing means having address coupling means for transferring a central processor unit generated address in said first control memory means to said control store, and control word coupling means for transferring independently of said bus an addressed one of said user-generated control words from said first control memory means to said central processor unit;

means, in said control store, for enabling the operation of said first control memory means or said second control memory means;

means, in said control store, for receiving a write signal from said central processor unit to indicate that said central processor unit is writing information into said first control memory means; and means, in said control store, responsive to said write signal and included in said enabling means, for disabling said first control memory means and enabling said second control memory means.

18. A microprogram-controlled data processing system wherein a set of system control words is augmented by an externally-supplied set of user-generated control words, said system comprising:

a control store having a first control memory means for storing said set of user-generated control words;

a central processor unit having a second control memory means for storing said set of system control words, said central processor unit constructed and arranged to execute either a system control word or a user-generated control word under the control of said microprogram, said central processor unit further generating (1) addresses for addressing said first control memory means, (2) instructions for controlling said control store, and (3) data for storing in said first control memory means;

a bus for coupling said central processor unit to said control store and for transferring between said control store and said central processor unit said generated addresses, instructions, and data;

means in said control store for receiving said transferred addresses, instructions and data, and for addressing said first control memory means in response to said received addresses;

means in said control store for transferring an addressed user-generated control word from said first control memory means to said central processor unit over said bus;

means for interfacing said central processor unit with said control store, said interfacing means having address coupling means for transferring independently of said bus a central processor unit generated address in said first control memory means to said control store, and control word coupling means for transferring an addressed one of said user-generated control words from said first control memory means to said central processor unit;

means coupled to said bus for loading said externally-supplied set of user-generated control words into said first control memory means under the control of said central processor unit;

means, in said control store, for verifying that said user-generated control words loaded in said first control memory means by said loading means have been correctly loaded;

means, in said control store, for disabling use of said control store when information is being loaded into said first memory means; and means, in said control store, for reenabling the use of said control store following the loading of said information into said first control memory means.

19. A microprogram-controlled data processing system wherein a set of system control words is augmented by an externally-supplied set of user-generated control words, said system comprising:

a control store having a first control memory means for storing said set of user-generated control words;

a central processor unit having a second control memory means for storing said set of system control words, said central processor unit constructed and arranged to execute either a system control word or a user-generated control word under the control of said microprogram, said central processor unit for generating (1) addresses for addressing said first control memory means, (2) instructions for controlling said control store, and (3) data for storing in said first control memory means;

a bus for coupling said central processor unit to said control store and for transferring to said control store said generated addresses, instructions, and data;

means in said control store for receiving said transferred addresses, instructions and data, and for addressing said first control memory means in response to said received addresses;

means in said control store for transferring an addressed user-generated control word from said first control memory means to said central processor unit over said bus;

means for interfacing said central processor unit with said control store, said interfacing means having address coupling means for transferring a central processor unit generated address in said first control memory means to said control store, and control word coupling means for transferring independently of said bus an addressed one of said user-generated control words from said first control memory means to said central processor unit;

means, in said control store, for decoding each of said instructions generated by said central processor unit, each of said instructions indicating the type of operation to be performed by said control store; and means, in said control store, for delaying a said operation for a period of time related to the time that the control store requires to get ready to process said type of operation indicated by said instruction.

20. A data processing system for executing user programs wherein during the execution of a user program a series of microinstructions are selected for execution by the system from a set of system control microinstructions to control the system in accordance with the instructions in the user program and further wherein said set of system control microinstructions is augmented by a set of externally-supplied, user-generated microinstructions, said system comprising:

a first control memory means for storing said set of system control microinstructions;

a control store having a second control memory means for storing said user-generated set of microinstructions;

a central processor unit coupled to said first control memory means for executing either a system control microinstruction or a user-generated microinstruction under the control of said user program, said central processor unit further generating (1) addresses for addressing said second control memory means, (2) instructions for controlling said control store, and (3) data for storing in said second control memory means;

bus means for transferring between said data processor unit and said control store said generated addresses, instructions, and data;

means in said control store for receiving said transferred addresses, instructions, and data, and for addressing said second control memory means in response to said received addresses;

means in said control store for transferring an addressed user-generated microinstruction from said second control memory means to said central processor unit over said bus means; and means for interfacing said central processor unit with said control store to transfer an address of a said user-generated microinstruction stored in said second control memory means to said control store and to transfer independently of said bus said addressed user-generated microinstruction to said central processor unit from said control store.

21. The data processing system of claim 20 further including means, coupled to said bus, for loading said user-generated microinstructions into said second control memory means.

22. The data processing system of claim 21 wherein each of said externally-supplied, user-generated microinstructions includes an address portion and an associated instruction portion, said address portion indicating the address in said second control memory means wherein said associated data portion is to be stored.

23. The data processing system of claim 22 wherein said loading means comprises:

a register receiving said user-generated microinstructions, said register having a microinstruction data store and a microinstruction address store wherein said bus means is controlled by said central processor unit for receiving said externally-supplied user-generated microinstructions and for transferring said instruction portion of each of said user-generated microinstructions to said microinstruction data store of said receiving register and said address portion of each of said user-generated microinstructions to said microinstruction address store of said receiving register;

a data-in register coupled to said second control memory means;

means coupling said microinstruction data store of said receiving register to said data-in register for the transfer therebetween of the instruction portions of said user-generated microinstructions; and address decoder means coupled to said microinstruction address store of said receiving register and said second control memory means to address the storage position in said second control memory means wherein the instruction portion associated with said address portion of said user-generated microinstruction is to be stored.

24. The data processing system of claim 23 further including system microinstruction disabling means coupled to said address decoder means for preventing the performance of a said system microinstruction when said central processor unit is controlled by said user program to perform a said user-generated microinstruction.

* * * * *